(12) United States Patent
Adcox et al.

(10) Patent No.: US 7,941,559 B2
(45) Date of Patent: May 10, 2011

(54) MEDIA ACCESS CONTROL ADDRESS TRANSLATION FOR A FIBER TO THE HOME SYSTEM

(75) Inventors: Timothy D. Adcox, Ponder, TX (US); Mahlon D. Kimbrough, Bedford, TX (US)

(73) Assignee: Tellabs Bedford, Inc., Naperville, IL (US)

( * ) Notice: Subject to any disclaimer, the term of this patent is extended or adjusted under 35 U.S.C. 154(b) by 2750 days.

(21) Appl. No.: 10/420,024

(22) Filed: Apr. 21, 2003

(65) Prior Publication Data

US 2003/0236916 A1 Dec. 25, 2003

Related U.S. Application Data

(60) Provisional application No. 60/374,690, filed on Apr. 23, 2002.

(51) Int. Cl.
G06F 13/00 (2006.01)
(52) U.S. Cl. .................................... 709/245; 709/249
(58) Field of Classification Search .................. 709/245, 709/249, 250, 230; 370/392, 466
See application file for complete search history.

(56) References Cited

U.S. PATENT DOCUMENTS

| | | | |
|---|---|---|---|
| 4,058,672 A | 11/1977 | Crager et al. |
| 4,408,323 A | 10/1983 | Montgomery |
| 4,476,559 A | 10/1984 | Brolin et al. |
| 4,491,983 A | 1/1985 | Pinnow et al. |
| 4,534,024 A | 8/1985 | Maxemchuk et al. |
| 4,577,314 A | 3/1986 | Chu et al. |
| 4,592,048 A | 5/1986 | Beckner et al. |
| 4,686,667 A | 8/1987 | Ohnsorge |

(Continued)

FOREIGN PATENT DOCUMENTS

EP 789470 8/1997

(Continued)

OTHER PUBLICATIONS

DeTreville, J.D. "A Simulation-Based Comparison of Voice Transmission on CSMA/CD Networks and on Token Buses", AT&T Bell Laboratories Technical Journal, vol. 63, No. 1, Jan. 1984, pp. 35-56.

(Continued)

*Primary Examiner* — Kenneth R Coulter
(74) *Attorney, Agent, or Firm* — Hamilton, Brook, Smith & Reynolds, P.C.

(57) ABSTRACT

A media access control (MAC) layer address translation system is included in a fiber to the home (FTTH) system having a central office that interfaces a packet data network with a passive optical network (PON). The (MAC) layer address translation system includes a home network unit (HNU), a host system, and a MAC address table. The HNU is coupled to the PON and has an associated base MAC layer address and an associated secondary MAC layer address that identify the HNU within the PON. The host system is coupled in a network to the HNU and has an associated host MAC layer address that identifies the host system within the network. The MAC address table is stored in a memory device, and associates the host MAC layer address with the secondary MAC layer address. Upon receiving an outgoing transmission from the host system that includes the host MAC layer address, the HNU accesses the MAC address table to determine the secondary MAC layer address that is associated with the host MAC layer address and modifies the outgoing transmission to replace the host MAC layer address with the secondary MAC layer address.

28 Claims, 18 Drawing Sheets

U.S. PATENT DOCUMENTS

| | | |
|---|---|---|
| 4,730,311 A | 3/1988 | Carse et al. |
| 4,763,317 A | 8/1988 | Lehman et al. |
| 4,768,188 A | 8/1988 | Barnhart et al. |
| 4,771,425 A | 9/1988 | Baran et al. |
| 4,881,225 A | 11/1989 | Dyke et al. |
| 4,888,765 A | 12/1989 | Dyke |
| 4,891,694 A | 1/1990 | Way |
| 4,903,292 A | 2/1990 | Dillon |
| 4,962,497 A | 10/1990 | Ferenc et al. |
| 4,967,193 A | 10/1990 | Dyke et al. |
| 5,014,266 A | 5/1991 | Bales et al. |
| 5,046,067 A | 9/1991 | Kimbrough |
| 5,136,411 A | 8/1992 | Paik et al. |
| 5,193,110 A | 3/1993 | Jones et al. |
| 5,247,347 A | 9/1993 | Literal et al. |
| 5,263,081 A | 11/1993 | Nightingale et al. |
| 5,267,122 A | 11/1993 | Glover et al. |
| 5,287,344 A | 2/1994 | Bye et al. |
| 5,303,229 A | 4/1994 | Withers et al. |
| 5,325,223 A | 6/1994 | Bears |
| 5,341,374 A | 8/1994 | Lewen et al. |
| 5,349,457 A | 9/1994 | Bears |
| 5,355,362 A | 10/1994 | Gorshe et al. |
| 5,381,405 A | 1/1995 | Daugherty et al. |
| 5,383,180 A | 1/1995 | Kartalopoulos |
| 5,421,030 A | 5/1995 | Baran |
| 5,463,616 A | 10/1995 | Kruse et al. |
| 5,469,282 A | 11/1995 | Ishioka |
| 5,491,797 A | 2/1996 | Thompson et al. |
| 5,499,241 A | 3/1996 | Thompson et al. |
| 5,500,753 A | 3/1996 | Sutherland |
| 5,504,606 A | 4/1996 | Frigo |
| 5,526,350 A | 6/1996 | Gittens et al. |
| 5,526,353 A | 6/1996 | Henley et al. |
| 5,544,163 A | 8/1996 | Madonna |
| 5,544,164 A | 8/1996 | Baran |
| 5,553,311 A | 9/1996 | McLaughlin et al. |
| 5,555,244 A | 9/1996 | Gupta et al. |
| 5,566,239 A | 10/1996 | Garcia et al. |
| 5,572,347 A | 11/1996 | Burton et al. |
| 5,586,121 A | 12/1996 | Moura et al. |
| 5,594,734 A | 1/1997 | Worsley et al. |
| 5,600,469 A | 2/1997 | Yamazaki |
| 5,608,565 A | 3/1997 | Suzuki et al. |
| 5,617,423 A | 4/1997 | Li et al. |
| 5,623,490 A | 4/1997 | Richter et al. |
| 5,640,387 A | 6/1997 | Takahashi et al. |
| 5,729,370 A | 3/1998 | Bernstein et al. |
| 5,742,596 A | 4/1998 | Baratz et al. |
| 5,784,377 A | 7/1998 | Baydar et al. |
| 5,808,767 A | 9/1998 | Williams et al. |
| 5,864,415 A | 1/1999 | Williams et al. |
| 5,870,395 A | 2/1999 | Baran |
| 5,880,864 A | 3/1999 | Williams et al. |
| 5,935,245 A | 8/1999 | Sherer |
| 5,995,491 A | 11/1999 | Richter et al. |
| 6,115,376 A | 9/2000 | Sherer et al. |
| 6,151,679 A * | 11/2000 | Friedman et al. ............ 726/3 |
| 6,240,513 B1 | 5/2001 | Friedman et al. |
| 6,466,986 B1 | 10/2002 | Sawyer et al. |
| 6,832,262 B2 * | 12/2004 | Cromer et al. ............ 709/245 |
| 7,408,955 B2 * | 8/2008 | Choi et al. ............ 370/468 |
| 7,466,705 B2 * | 12/2008 | Saito et al. ............ 370/392 |

FOREIGN PATENT DOCUMENTS

EP        829995        3/1998

OTHER PUBLICATIONS

Montgomery, Warren, A. "Techniques for Packet Voice Synchgronization", vol. Sac-1, No. 6, Dec. 1983, pp. 1022-1028, IEEE Journal on Selected Areas in Communications.

* cited by examiner

MEDIA ACCESS CONTROL ADDRESS TRANSLATION FOR A FIBER TO THE HOME SYSTEM

CROSS-REFERENCE TO RELATED APPLICATION

This application claims priority from and is related to the following prior application: "Media Access Control Address Translation," U.S. Provisional Application No. 60/374,690, filed Apr. 23, 2002. This prior application, including the entire written description and drawing figures, is hereby incorporated into the present application by reference.

FIELD

The technology described in this patent application relates generally to the field of fiber optic communication systems. More particularly, the application describes a fiber to the home (FTTH) system that utilizes media access control (MAC) layer address translation.

BACKGROUND

Fiber-to-the-curb (FTTC) systems are known in this field. Data transmission over a typical FTTC system may, however, result in a security breach in which an end user can modify the Ethernet address of a host device, known as the media access control (MAC) address, to mimic that of another host device. In this manner, data transmissions intended for one host device on the FTTH system may be intercepted and accessed by another host device mimicking the MAC address of the intended recipient device. This data pirating technique is commonly known in the field as MAC spoofing.

SUMMARY

A media access control (MAC) layer address translation system is included in a fiber to the home (FTTH) system having a central office that interfaces a packet data network with a passive optical network (PON). The (MAC) layer address translation system includes a home network unit (HNU), a host system, and a MAC address table. The HNU is coupled to the PON and has an associated base MAC layer address and an associated secondary MAC layer address that identify the HNU within the PON. The host system is coupled in a network to the HNU and has an associated host MAC layer address that identifies the host system within the network. The MAC address table is stored in a memory device, and associates the host MAC layer address with the secondary MAC layer address. Upon receiving an outgoing transmission from the host system that includes the host MAC layer address, the HNU accesses the MAC address table to determine the secondary MAC layer address that is associated with the host MAC layer address and modifies the outgoing transmission to replace the host MAC layer address with the secondary MAC layer address.

DETAILED DESCRIPTION

I. FTTH System Overview

Figure 1:
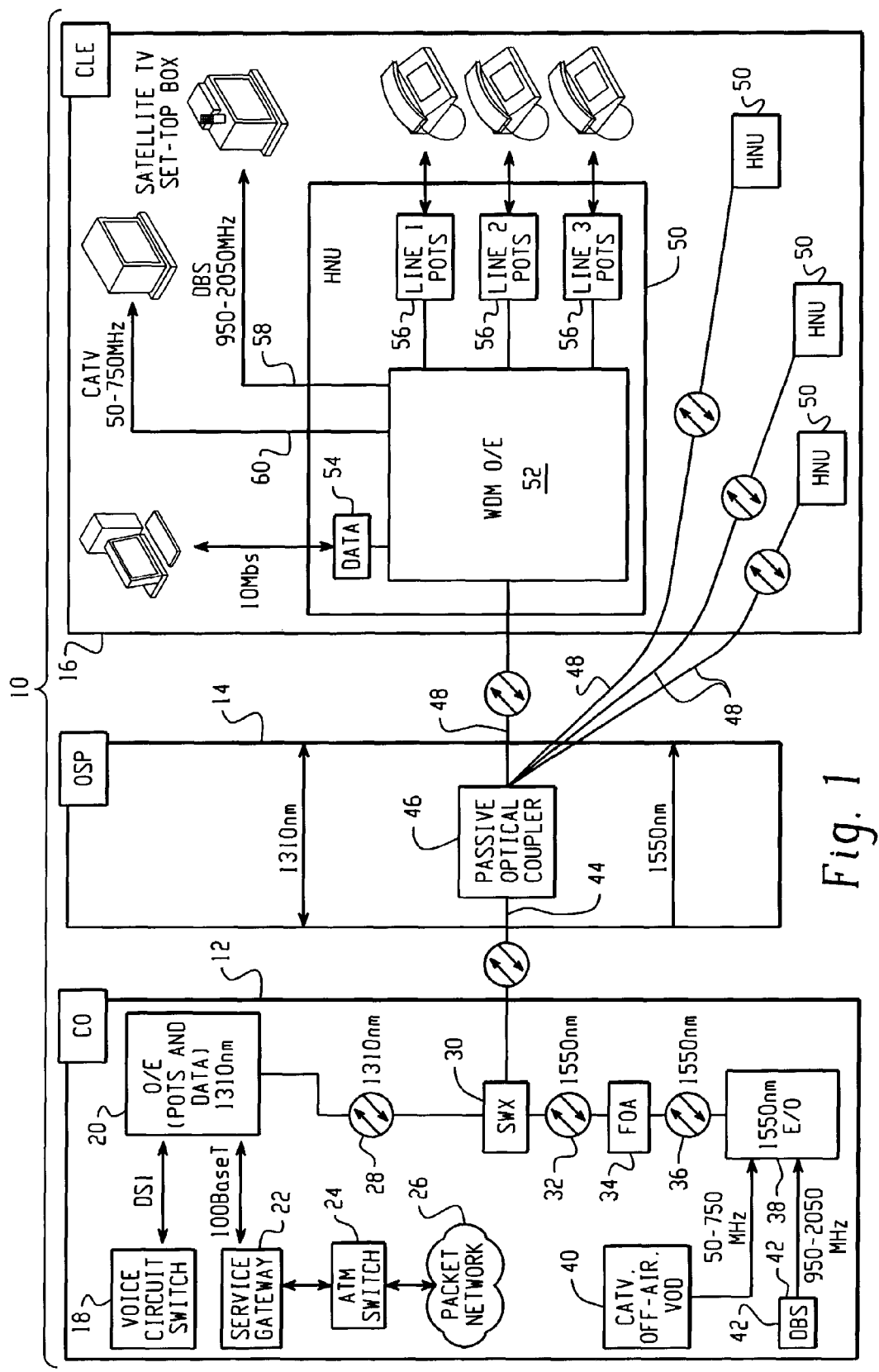
FIGS. 1-16B set forth an exemplary FTTH system that may be used with the MAC layer address translation system illustrated in FIGS. 17-19.

The fiber to the home ("FTTH") system described in this application preferably utilizes a Passive Optical Network ("PON") architecture configured in a star-star configuration with split ratios selected to provide maximum service bandwidth while lowering distribution costs. All of the electronic components are preferably in the central office or in the residence; i.e., there are preferably no active components in the feeder or distribution plant, although in certain embodiments there could be. The major benefit of this architecture is extremely low maintenance cost and high service quality. Multi-media services are combined at a central location, assumed hereafter to be a Central Office ("CO"). These services are then transmitted to various customers over a fiber optic network that extends from the CO to the homes or businesses of the individual customers. A passive optical splitter terminates each fiber in the distribution plant and feeds up to four customers with a single fiber entering each residence or business.

All voice, data and video services subscribed to by each customer are processed in the CO by specialized equipment, including optical video distribution equipment and packet voice/data distribution equipment (described below). Circuit switched voice lines from a CO switch and high speed data from packet data routers are feed to a Distribution Shelf (MDS), combined, put in packet format and converted into an optical signal for transmission. CATV signals acquired from an antenna system or service provider (or video on demand signals) are combined with the signal from a Direct Broadcast Satellite (DBS) antenna, amplified, split and wave division multiplexed (WDM) with the voice/data packet signals. The fiber outputs of the optical and packet voice/data systems at the CO are optical signals each containing unique voice, data and video subscribed to by the customer(s). Passive functions of splitting, wave division multiplexing and routing of fibers for splicing into distribution fibers is performed by an Optical Mainframe, which is also preferably located at the central location.

Each fiber leaving the CO is preferably assigned to a group of four customers, although it could service more or less customers depending on the implementation. The various multi-media signals on the fibers are preferably transmitted for distances up to 33 kft without amplification before being terminated by the passive splitters serving each group of four customers. The signals at the output of the splitters are applied to a drop fiber servicing a single home/business that can be up to 3.3 kft in length. This allows serving dense and sparsely populated areas (residences could be a mile apart in rural areas). The drop fiber is terminated at the customer premise in an electronic unit called The Home Network Unit ("HNU") The HNU performs the primary function of separating downstream signals and converting them to their proper formats for voice, data and video distribution in the home or business, and conversely combining upstream voice, data and perhaps video control signals into an upstream signal for transport back to the central office.

The HNU preferably includes three standard connectors for three independent phone lines, one connector for data and two coax connectors, one providing CATV (or NTSC) video and the other for Digital Broadcast video. Each video output supports up to four TV sets or DBS set top boxes depending on the service, without additional amplification. With additional amplifiers in the HNU, more than four connections may be supported. The FTTH system provides high-speed symmetrical (i.e, bi-directional) data transport using a secure Point-to-Point Protocol over Ethernet (PPPoE) transport protocol. Data from customers is aggregated and converted, if necessary, at a CO to a protocol compatible with the Internet Service Providers. The HNU is preferably powered from a standard 115V AC source at the residence. Additionally, an optional battery backup unit for maintaining POTS service in the event of an AC power outage is provided.

II. FTTH Multimedia Access System

Figure 2:
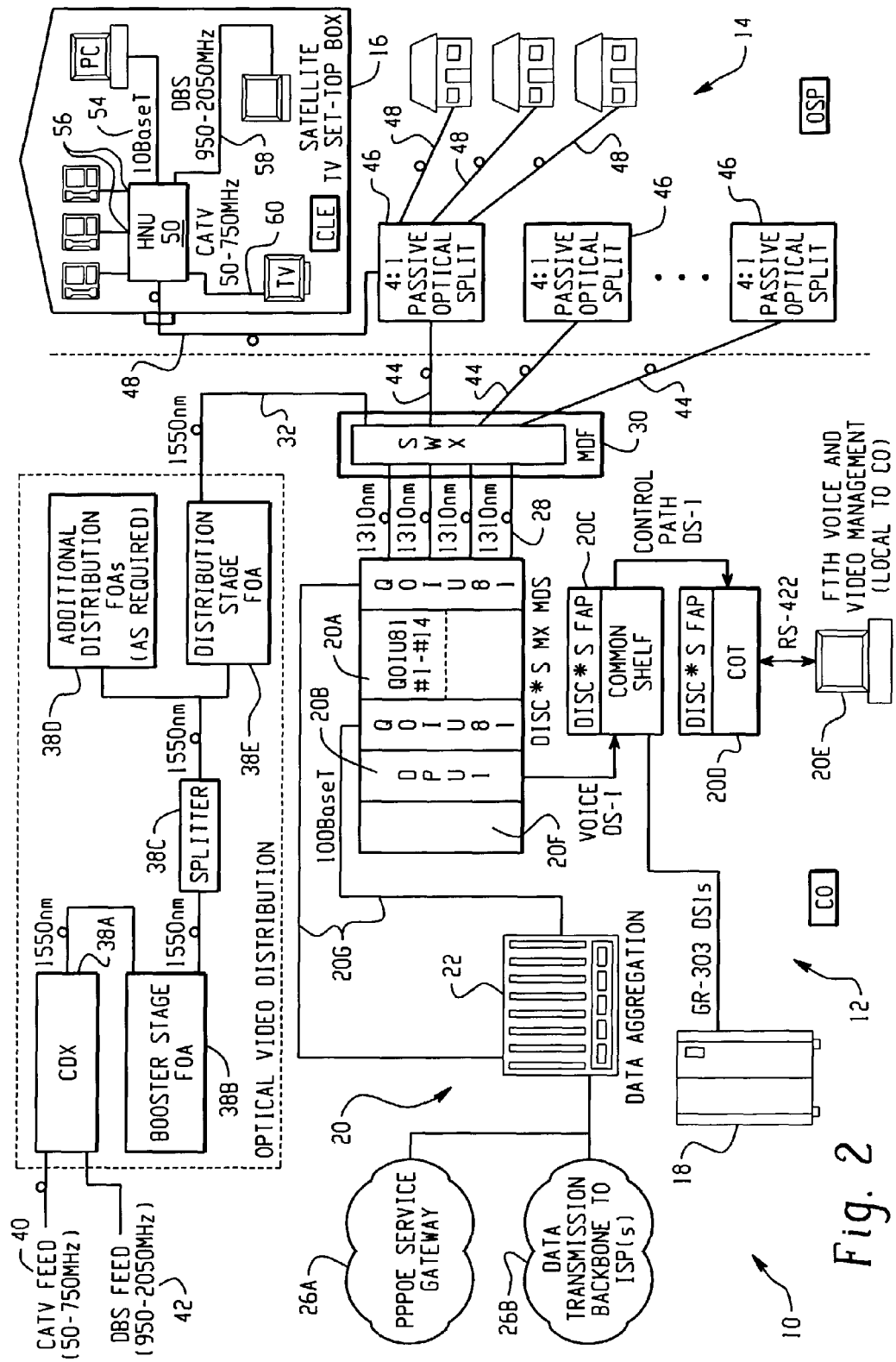

FIGS. 1-16B set forth several exemplary embodiments of a FTTH multimedia access system. FIG. 1 sets forth an exemplary embodiment of an FTTH system 10. FIG. 2 sets forth a more detailed schematic of the system shown in FIG. 1.

The preferred multimedia services provided via the system 10 are Plain Old Telephone Service (POTS), high-speed data and video. All three services are combined and distributed from a central location 12, assumed herein to be a Central Office, and transmitted to customers over a fiber optic network 14. The resulting Outside Plant 44, 46, 48 preferably contains no active components and thus is referred to as a Passive Optical Network (PON). A passive optical splitter 46 terminates a single fiber 44 in the distribution plant and feeds up to four customers.

The FTTH system 10 is optimized for low initial first cost. Service costs are deferred until there is demand on a per customer basis. The initial first cost is driven by low OSP cost to place only the fiber cable in the network, either aerial or buried, with no intermediate cross connects. Once a customer requests service, a drop fiber 48 is delivered to the individual home via a splice 46 off of the primary fiber cable 44.

Delivery of services is CLE (Customer Located Equipment) based 16. A single, locally powered CLE unit 50 (HNU) provides voice, video and data services from the fiber 48 entering the home. Once installed, the high bandwidth of the fiber network combined with the simplicity of CLE deployment allows for an increase (scalability) in CLE feature sets and accommodation of new services without requiring additional construction.

The Central Office Equipment 12 preferably utilizes a Marconi® MX NGDLC (Next Generation Digital Loop Carrier) product (available from Marconi Communications, Irving, Tex.) that provides network distribution, connectivity and control of broadband video and data plus telephony functionality, including a Telecordia certified GR-303 switch interface. Included with the NGDLC product is a unique Optical Mainframe 62 for fiber management, optical multiplexing, and termination as well as an optical video distribution subsystem 38, 34, 30. The FTTH system 10 can be deployed as an overlay in areas where there is a demand for voice, video and data services, as an alternative method for outside plant rehab, overlay, or in greenfield construction.

The equipment making up the exemplary FTTH system 10 shown in FIGS. 1 and 2 consists of the following elements: (1) The Home Network Unit (HNU) 50 is the CLE unit. The HNU 50 is attached to the fiber OSP 48 and provides voice, video and data services distributed by the DISC*S® MX Distribution shelf (MDS) 20 at the CO. The HNU 50 preferably receives local power from an external power supply and an optional battery backup supply; (2) The DISC*S® NGDLC configured with the MX Distribution shelf (MDS) that supplies voice/video/data distribution cards that interface with the fiber OSP and with the upstream network switching elements; (3) The SWX Optical Mainframe 30, which provides management of the distribution fibers from the HNUs, mass fusion splicing for termination into optical distribution equipment and wave division multiplexing; (4) The optical video distribution 38A-38E consisting of fiber amplifiers and transmitters for broadcast of DBS 42 and CATV video 40; (5) The broadband data aggregation equipment for transferring packet data to the ISP traffic transmission backbone 26A, 26B; and (6) Element Management Systems 20E to provide operational control of the above items as required or appropriate.

A. Outside Plant (OSP)

The OSP is optimized for aerial construction, although the architecture is applicable to buried construction as well. The OSP is constructed of fiber cables 44 extending from a central or remote switching location throughout the service area. Each fiber provides service preferably to four homes. The signals on the fibers are transmitted for distances up to 33 kft, without amplification, before termination at a passive splitter 46. The 4:1 splitter terminates the fiber 48 in close proximity (3.3 kft or less) to four homes or living units. A single fiber drop 48 extends from the splitter 46 to each of the living units and terminates at the HNU 50. The four way splitters 46, the fiber drops 48, termination of the fiber drop and installation of the HNU 50 are added to the system as service is required.

B. Home Network Unit (HNU)

The HNU 50 is located inside the customer premise 16 and provides the following services: (i) 3 POTS lines 56; (ii) 1 CATV drop (50-750 MHz) 60; (iii) 1 DBS drop (950-2050 MHz) 58; and (iv) 1 10 Mbps Ethernet drop 54. The HNU 50 is locally powered via an external power supply co-located inside the customer premise 16. Lifeline POTS is supported by optional battery backup on a single POTS line. The battery backup consists of a unit external to the HNU 50 that accepts commonly available "C" cell or 9 volt batteries.

The HNU 50 is preferably mounted on a wall inside the living unit. The HNU housing is preferably a "clam shell" box with a hinged cover providing access to the circuit board and fiber loop inside the unit. A lock is provided to prevent unauthorized entry to the HNU.

The fiber drop cable 48, including an optional metallic strength member, enters the HNU 50 housing. The mechanical termination of the fiber cable 48 and optional strength member is provided as an integral part of the HNU 50 housing. The fiber drop 48 termination is provided jointly by the HNU 50 unit mechanics and the HNU 50 circuit board. The HNU 50 hinged cover contains an integrated fusion splice tray where the fiber drop to the home is spliced into the HNU internal fiber loop. The HNU internal fiber loop is then terminated on the HNU circuit board. A further description of this fiber splice tray is seen in U.S. application Ser. No. 09/520,587 now U.S. Pat. No. 6,427,045, titled "Splice Tray for use in Splicing Fiber Optic Cables and Housing Therefore," the disclosure of which is into this application by reference.

The HNU 50 provides all services on a single circuit card mounted in the housing. The HNU circuit board provides the WDM and electrical to optical conversion functions to extract the POTS and data signals from the 1310 nm wavelength and the video signals from the 1550 nm wavelength. In the upstream direction the HNU 50 converts the electrical signals to optical signals and multiplexes the 1330 nm and 1550 nm wavelengths onto the fiber for transport back to the CO.

The POTS, video and Ethernet data are provided as connectorized outputs on the HNU 50 housing. Three RJ11 connectors are provided for connection to the house telephone wiring. Each connector provides a separate, private line. Two 'F' type connectors are provided for video feeds into the customer premise. One connector provides the CATV signal and the other provides the digital DBS signal. A single RJ45 connector is provided for a 10Base-T high-speed data connection to the customer's computer.

Voice traffic is received and transmitted in a packetized format by the HNU 50. The HNU 50 provides the battery (optional external), ringing, supervision (off-hook/on-hook), and PCM coding of telephony BORSCHT functions for each POTS line. The resulting POTS line interfaces at the three RJ11 jacks on the HNU 50 meet the requirements of TR-57, as applicable. The POTS line interfaces are also compatible with implementation of CLASS services.

The video signal 60 reception range is from 50 to 2050 MHz. The DBS signal 58 reception is 950-2050 MHz. Standard DBS set top boxes will be used to decode the signals. CATV signal reception is 50-750 MHz.

The HNU CATV interface (coax 'F' connector) complies with NTSC standards and provides 25 analog channels and 140 digitally-modulated channels of programming. The HNU DBS interface (coax F connector) complies with the Hughes DBS standard for the provision of a full range of DBS channels.

HNU data traffic is received and transmitted as Ethernet packets using Point-to-Point Protocol over Ethernet (PPPoE). The 10Base-T interface provided at the HNU 50 is IEEE 802.3 compliant. The HNU 10Base-T interface is connected to a standard Network Interface Card (NIC) installed in the customer's computer over CAT-3 or CAT-5 cabling in the home. The PPPoE session is initiated at the customer's computer and terminated by the ISP provider. The high-speed data service downstream performance is 20 Mbps shared among four homes connected at the Passive Optical Splitter 46 with downstream burst capability of 10 Mbps to each home. The upstream performance is 4.5 Mbps dedicated for each home. All four of the homes linked to the Passive Optical Splitter 46 have the ability to conduct simultaneous 4.5 Mbps data sessions.

The HNU 50 executes power shedding during an AC power outage to automatically shut down video and data services to conserve battery power.

C. Central Office (CO) Equipment

The CO equipment consists of a Splitter WDM Frame (SWX) 30, fiber amplifiers and transmitters 38A-38E, DISC*S® MX MDS 20A 20B, 20F, DISC*S® Common Shelf 20C, broadband data aggregation equipment 22, plus the corresponding management systems 20E. The CO equipment supports existing NGDLC capabilities (TR-008, GR-303) plus the interfaces to OSS systems required for management of video and data traffic.

The Splitter WDM Frame (SWX) 30 assembly collects the feeder network fibers from the HNUs 50 via the CO cable vault. The SWX shelf 30 subassembly is a passive optical signal distribution system that provides mass fusion termination of up to 96 of these fibers to fiber jumpers routed to the DISC*S® MX MDS 20F shelf. The SWX 30 also performs the WDM function to separate the 1310 nm signals (voice/data) from the 1550 nm signals (video) onto separate fibers within the CO. A single fiber carrying 1550 nm video signals is routed to the Optical Video Distribution equipment 38A-38E. Fibers carrying 1310 nm voice/data signals from all the HNUs 50 (4 per fiber) are routed to the MDS shelf(s) 20F. The SWX 30 also provides multiplexing of a 1550 nm video broadcast signal from a single fiber to 32 outgoing fibers.

The CATV and DBS signals 40, 42 entering the CO from the service provider head-end and satellite are received at the CDX 38A, which combines both signals into a 1550 nm signal carried over a single fiber. This combined optical video signal is then amplified by a high power optical amplifier (FOA) 38B that acts as the "booster" stage in the CO Optical Video Distribution subsystem. The output of the booster FOA is fed to an optical splitter 38C that fans out the combined optical video signal to multiple parallel FOAs 38D, 38E that act as the distribution amplifier stages. The number of distribution FOAs is a function of the number of fibers in the network. The output of the distribution FOA is routed over fiber to an SWX(s) 30. A preferred FOA is an Erbium-Doped Fiber Amplifier (EDFA), although other types of optical amplifiers could be used.

The fibers carrying voice and data signals over 1310 nm are routed from the SWX 30 to the MX MDS shelf 20F. The fibers are connected directly to the QOIU81 (Quad Optical Interface Unit) cards 20A in the MDS shelf. Each QOIU81 20A accepts four fibers, where each fiber is carrying voice and data for four of the HNUs 50. There are 14 QOIU81 slots available in the MDS shelf 20F, therefore each MDS shelf supports 224 HNUs (14 cards×4 ports per card×4 homes per port). Since each HNU 50 represents 3 POTS lines, the MDS shelf can distribute up to 672 POTS channels.

The QOIU81 card 20A performs the optical to electrical conversion for four optical signals. The voice data is removed from the data stream received from the HNU 50 and routed to a structured DS-0 TDM bus on the MDS backplane. The TDM data is passed to the DPU1 (Data Processing Unit) 20B where the TSI function local to the MDS backplane is performed. The TDM voice data is then passed to the DISC*S® Common shelf 20C co-located in the same frame as the MDS shelf 20F.

The DISC*S® Common Shelf 20C performs call processing and provides a TR-008 or GR-303 interface to the voice switch. The Common Shelf 20C implements a non-blocking 672×672 channel Time Slot Interchanger. The Common Shelf implementation of GR-303 is fully compliant to Telcordia requirements and has been certified with all the major switch vendors' equipment. The GR-303 implementation includes flexible concentration.

The Common Shelf 20C further includes a Fuse and Alarm Panel that monitors the MDS shelf 20F as well as the Common Shelf 20C elements. The Fuse and Alarm Panel includes 16 alarm contacts that can be used to monitor other equipment, such as the Optical Video Distribution equipment.

The 1310 nm optical signals 28 received by the QOIU81 cards 20A in the MDS shelf also include Ethernet data packets from the HNUs 50. In similar fashion to the voice traffic, the QOIU81 20A removes the data packets from the digital signals derived from optical to electrical conversion of the signals received from all four fibers terminated at the card. The QOIU81 20A multiplexes the Ethernet data packets onto a single 100Base-T output 20G. The 100Base-T output 20G carries data traffic from 16 homes consisting of up to 4 PPPoE sessions each. The 100Base-T signal from each QOIU81 20A is connected to an external Data Aggregation device 22 over CAT-5 wiring in the CO.

The Data Aggregation device(s) 22 aggregates the Ethernet traffic from the QOIU81s 20A in the MDS shelf(s) 20F. The output of the Data Aggregation device 22 is connected to the telephony service provider's Data Transmission Backbone 26A, 26B.

D. Element Management Systems

A Supervisory System (SS) platform 20E is connected to the FTTH system 10 via the Central Office Terimal (COT) 20D. The COT provides a control path DS1 to the Common Shelf 20C which carries control messages to/from the MDS shelf 20F and to the HNU 50 via the fiber link. The SS 20E is connected to the COT 20D via a RS-422 connection. One COT 20D controls up to 16 Common shelves 20C.

The SS 20E provides the interface to the system operator's Operational Support Systems (OSS). The SS manages tasks such as System Configuration, Provisioning, Maintenance, Inventory, Performance Monitoring and Diagnostics.

Turning now to the remaining drawing figures, FIGS. 3-14 describe another exemplary embodiment of a FTTH multi-media access system.

Figure 3:
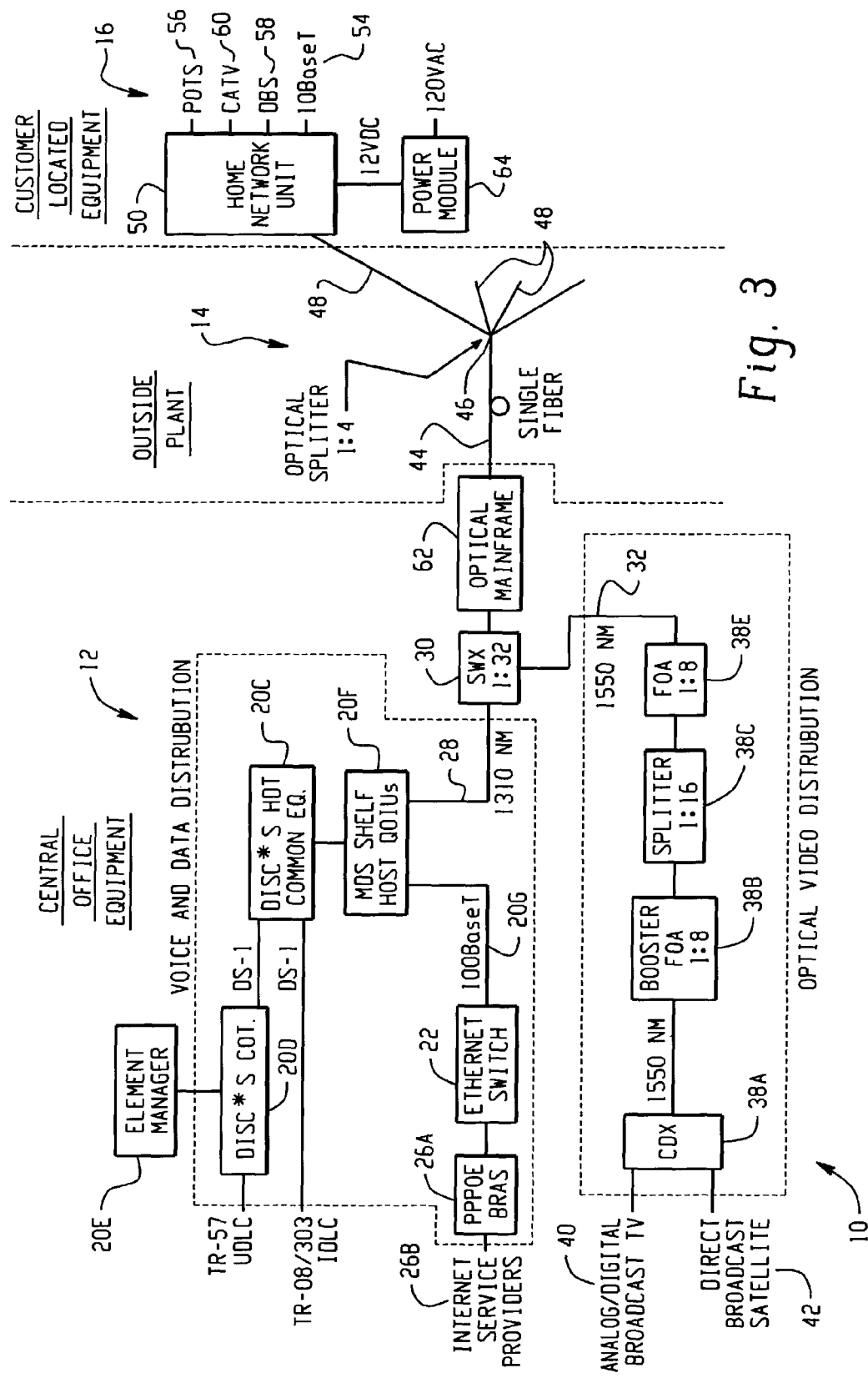

FIG. 3 sets forth an overview of a FTTH system 10, which is based on the DISC*S® NGDLC system mentioned above, and more specifically, the DISC*S® MX system. This system 10 transports telephony, Packet data, CATV and DBS signals to the various subscribers via the optical network 44, 46, 48. In the upper left-hand corner of the Figure is a DISC*S® central office terminal (COT) 20D, which provides a TR57 UDLC interface to the central office for DS-0 telephony service. The DISC*S® COT 20D has an element manager 20E associated with it for managing the system, assigning service, cross-connects, monitoring alarm report history, etc. The DISC*S® HDT 20C is the remote terminal end of the DISC*S® platform. In this system, the HDT unit 20C is supplied in the central office rather than being out in the field in a cabinet where it's typically located in a digital-loop carrier application, such that it is co-located with the central office terminal COT. The DISC*S® HDT 20C communicates directly to a class-5 digital switch via the TR08 or TR303 standards for integrated digital loop carrier applications. The DISC*S® HDT 20C includes a common equipment shelf 20C and a matrix distribution shelf 20F. The common equipment shelf 20C includes circuitry for handling telephony information, and the matrix distribution shelf 20F includes circuitry for combining the processed telephony information with Ethernet Packet data for distribution to the subscribers.

The matrix distribution shelf 20F is normally used in DLC applications to provide distribution to optical network units (ONU's) using Quad OIU (QOIU) cards 20A. In this embodiment, however, the Quad OIU cards 20A have been modified (as described below) to support the multi-media services provided in the FTTH system 10. Each Quad OIU card 20A has a 100 Base-T interface that interfaces to an Ethernet switch 22 going upstream for internet service providers (ISPs) 26B. The Ethernet switch 22 is coupled to a PPPOE server 26A, which controls customer access to the ISPs 26B. This interface is utilized because typically the access loop provider (i.e., the telephone companies) cannot be an ISP themselves; instead, they provide the access, and transport mechanisms to various ISPs, including their own brand of ISP, for example.

Internet access is provided via a plurality of 100 Base-T connections 20G, which are preferably shared over 16 HNUs 50. The data connection is coupled to the QOIUs 20B in the MDS shelf 20A, where the various 100 Base-T signals are combined, and then coupled to the SWX element 30 via a 1310 nanometer wavelength 2 optical fiber 28.

The SWX element 30 is an optical distribution system. It includes WDMs that combine the 1310 nanometer signal 28 from the QOIUs 20A with a 1550 nanometer optical video signal 32 from the FOA 38E into one combined optical signal to feed the fibers 44 going out towards the subscribers. In addition, the SWX 30 includes a 1-for-32 splitter for the 1550 nanometer signal in order to share it over multiple fibers 44.

The bottom left-hand corner of FIG. 3 shows the CO circuitry for interfacing with sources of analog/digital broadcast TV (i.e., CATV, VOD, etc.) and DBS signals 40, 42 (the optical video distribution circuitry). These signals 40, 42 are input to a CDX 38A. The CDX 38A is a CATV-DBS transmitter. The CDX 38A combines the CATV and DBS signals 40, 42 into a combined optical video signal at 1550 nanometers, which is subsequently distributed to a large number of HNUs 50.

The output of the CDX 38A is coupled to a booster FOA (preferably an Erbium Fiber Doped Amplifier) 38B, which takes the combined optical video signal and amplifies it to provide 3 outputs of 20 DBM optical each. These 3 outputs are then coupled through 1-for-16 splitter on each of the 3 outputs, and each one of those 16 outputs then drives a second FOA 38E with 8 outputs. The outputs from the second FOAs 38E are then coupled into the SWX 30, and go into a 1-for-32 splitter, which is combined in a WDM with a 1310 nanometer signal from each of the 4 OIUs on a Quad OIU card 20A in the MDS shelf 20F. These signals are then routed to an optical mainframe 62, which is a cross-connect for the fibers, and out to a 1-to-4 splitter 46 going to the individual home network units 50. In this manner, one CATV feed 40 can support 3×16×8×32×4, or approximately 50,000 subscribers.

Each subscriber has a Home Network Unit (HNU) 50 preferably mounted inside their home. Coupled to the HNU 50 is a power module 64. The power module 64 takes 120 volts AC, drops it down to 12 volts DC, and feeds DC power to the home network unit 50. The power module 64 is external to the HNU 50 so that it handles all the UL requirements and other safety requirements as an external module. There may be an optional battery backup box plugged into the home network unit 50 in order to maintain telephony communication in the event of a power failure.

The home network unit (HNU) 50 takes the 1550 nanometer downstream video signal 32, and recovers the 50-750 MHz band as CATV or other types of TV signals. It also splits off approximately 950 to 2050 MHz for direct broadcast satellite (DBS) signals and distributes that to the home. The HNU takes the 1310 nanometer voice/data signal 28 and derives the Packet data service 54 (Ethernet), which preferably supports a 10Base-T interface to the subscriber's computers, and i.e., the POTS service 56 that supports 3 telephone lines per subscriber.

Each Quad OIU card 20A at the central office 12 supports 4 fibers, and with the 4-to-1 split on each one of these fibers, 16 home network units 50 can be coupled to one Quad OIU card 20A. The sixteen 10Base-T interfaces 54 in the homes are aggregated into a single 100 Base-T interface 20G back into the Ethernet switch 22 at the central office 12. In this manner, one 100 Base-T port supports 16 homes.

Figure 4:
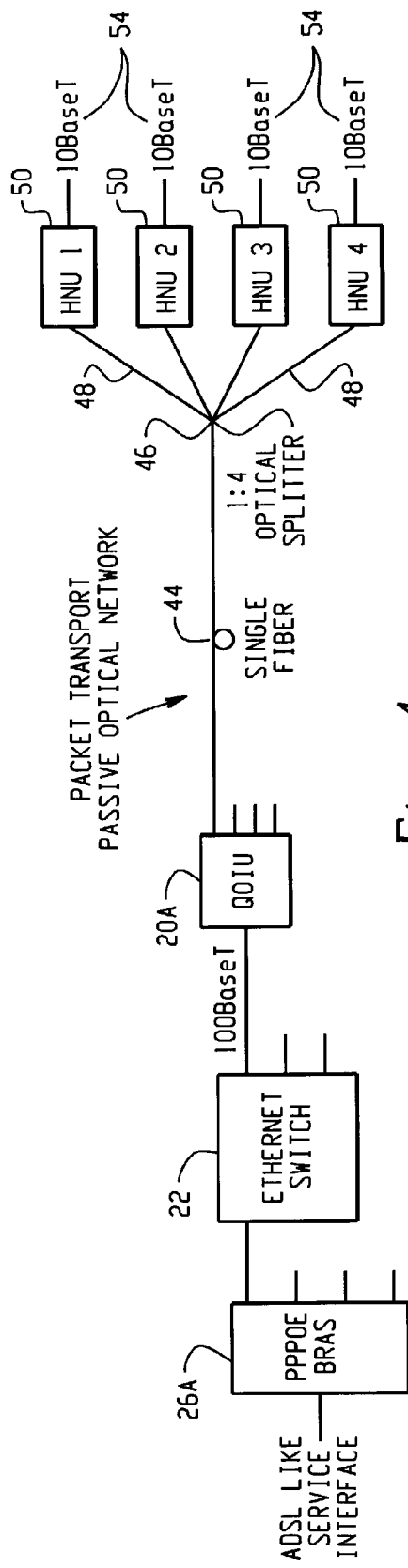

FIG. 4 is a block diagram showing TCP/IP data transport over an Ethernet connection in a FTTH system. This figure depicts data flow from the PPPOE broadband remote access server 26A to the individual 10Base-T connections of the HNUs 50. From the PPPOE server 26A, the data connections fan out through Ethernet switches 22. Each Ethernet switch 22 supports multiple 100 Base-T interfaces 20G to each Quad OIU card 20A, which in turn supports 4 fibers, or 16 HNUs 50, each having a 10 Base-T connection.

Via this connectivity, the subscriber can connect their computer via Ethernet to the home network unit 50. The subscriber installs a PPPOE client on their computer that allows them to access ISPs through a dial-up networking client. Thus, to the subscriber software, the Ethernet connection looks just like a dial-up connection, but their is no dialing (as with a modem), and the connection is always active. The subscriber can drop a connection and make a connection to another ISP or to their corporation or to some other source. The traffic capacity downstream in this configuration is preferably 10 Mbps, with upstream capacity at 4.516 Mbps, as limited by the TDMA PON signaling scheme, discussed below with reference to FIG. 7. Note that because the architecture of this embodiment is inherently scalable and only limited by the ability to transport light down the fibers, in the future other higher-speed data services, such as 100Base-T and even Gigabit Ethernet and beyond could be implemented to the HNUs 50.

Figure 5:
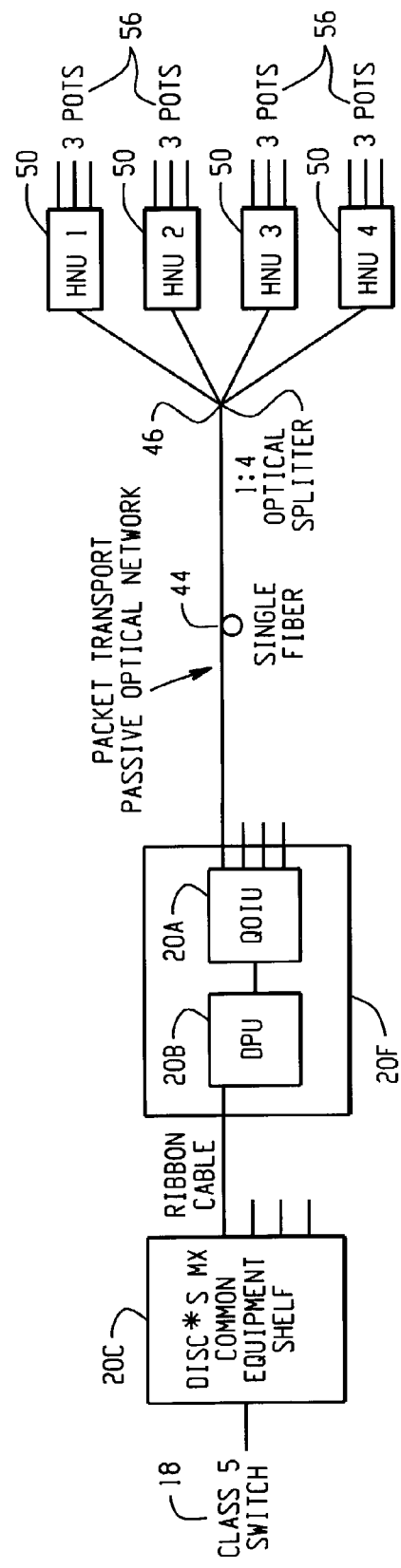

FIG. 5 is a block diagram showing POTS telephony transport in a FTTH system. Here, the telephony data is packetized and routed to and from a class 5 digital switch 18 in the central office 12, and it interfaces to the DISC*S® MX common equipment shelf 20C. The common equipment shelf 20C includes all of the circuitry necessary for proper routing and processing of the telephony data, such as an integrated Time-Slot Interchanger (TSI). From the DISC*S® MX shelf 20C there are a plurality of ribbon cables coupling the common shelf 20C to the matrix distribution shelf 20F. The MDS Shelf 20F includes one or more drop processor unit cards 20B and a plurality Quad OIU cards 20A. From the QOIU cards 20A there are a plurality of fibers 44. Each fiber is coupled to a plurality of passive optical splitters 46, which preferably split off to service four HNUs 50. Each HNU 50, in turn, provides 3 POTS lines to a subscriber. Thus, each fiber 48 supports 12 POTS lines.

The voice (telephony) information is handled in the system by configuring the voice data into packets and transporting these voice packets over the fibers 48, 44 back to the common equipment shelf 20C at the central office 12. Thus, the system of the present invention provides packetized voice transport in the local loop. In the present invention, the packetization of the voice traffic is carried out at layer 2 of the OSI standard communication layer model, which provides many advantages over other packet voice transport schemes, such as IP telephony, including greater bandwidth management flexibility, lower latency, etc.

The logical pipe for transporting the voice traffic is shared on a point-to-point basis between the home network units HNUs 50 and the Quad OIUs 20A, and voice traffic is prioritized over upstream data traffic. A special cut-through feature is implemented at the HNU 50 so that when a voice packet is ready to transmit, any data packet currently being sent is paused and the voice packet is cut-through for immediate transmission. This is done to prevent voice packets from having to wait until a large data packet completes transmission, which could take several TDM bursts. Once the voice packet has been transmitted, and assuming there are no other voice packets in the queue to transmit, the HNU 50 will then resume data transmission.

Figure 6:
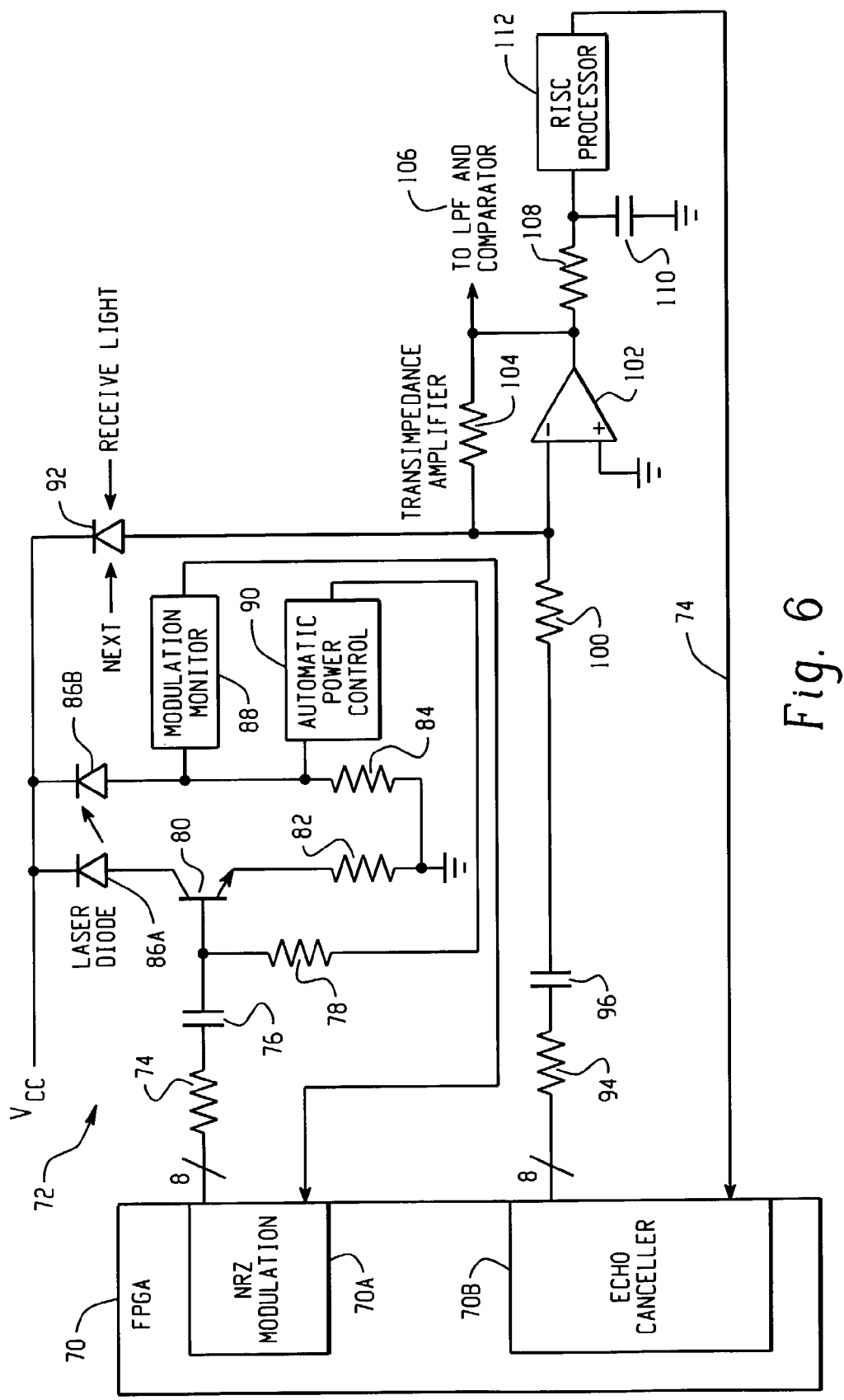

FIG. 6 is a circuit schematic of a preferred optical transceiver employing echo cancellation for use with a FTTH system. In this embodiment, voice traffic is transmitted on the 1310 nm signal, both upstream and downstream using directional multiplexing. With this technique, upstream and downstream light signals at 1310 nm are simultaneously transmitted on the same fiber. In order to accomplish this technique, the system must minimize reflections on the fiber so that echoes from a transmitter on one end of the fiber are not received by the receiver on the same end of the fiber. There are several methods employed in the FTTH system 10 for minimizing reflections and echoes. One mechanical method is to use all-fusion splicing for the fiber connections. Another mechanical method is to use an angled connector that has very low reflection where the fiber couples to the electronics at the central office 12. A third method is the use of a special optical transceiver with echo cancellation, which is shown in FIG. 6. Using this circuit, any echoes created by the transmitter are detected and compensated for using the echo cancellation circuitry in order to reduce the near end cross talk between the transmitter and receiver on the one end of the fiber.

The circuit shown in FIG. 6 shows an exemplary optical transceiver having an echo cancellation circuit. The digital laser driver portion of the circuit shown in FIG. 6 includes an FPGA 70 for synchronizing the digital modulation signal, which is preferably NRZ-type modulation 70A, a laser diode driver circuit including driver transistor 80, resistors 74 and 82, and capacitor 76, laser diode 86A, back-facet photodiode 86B (along with current setting resistor 84), a modulation monitor circuit 88 which is fed back to the digital FPGA 70 to control the modulation synthesis, and an automatic power control feedback loop 90, 78, which controls the power levels of the laser diode 86A.

The echo cancellation portion of the circuit includes receiver photodiode 92, amplifier 102, and associated circuitry 104, 108, 110, a RISC processor 112, an echo canceller clock 70B in the digital FPGA 70, and a filter 94, 96, 98. The echo canceller circuit generates a signal that emulates the near and cross-talk signal (NEXT) and provides a cancellation signal into the negative input of the amplifier 102, thus compensating for the near end cross talk.

This circuit operates slightly differently depending upon whether it is located at the QOIU 20A or the HNU 50. At the HNU 50, the transmitter is not always transmitting, so the RISC processor 112 can measure the difference in receive light level when the transmitter is transmitting and when it is not. The RISC processor 112 can then adjust the strength of the transmit cancellation signal output from the echo canceller block 70B until there is no difference in receive level when the transmitter is on, thus nulling the near end crosstalk signal.

When operating at the QOIU 20A, the RISC processor 112 adjusts the echo canceller block 70B at power up before allowing the HNUs 50 to start transmitting. Then it will monitor the canceller during the guard times between HNU transmissions. The NEXT signal has no variable delay with respect to the transmitted signal. Thus, a variable level version of the transmitted signal can be introduced into the receive transimpedance amplifier 102, 104 to cancel the NEXT signal.

The RISC processor 112 has an analog to digital converter on chip. It will monitor the average receive signal from the transimpedance amplifier 102, 104 and instruct the FPGA 70 to either increase or decrease the cancellation signal until the proper cancellation level is achieved.

Figure 7:
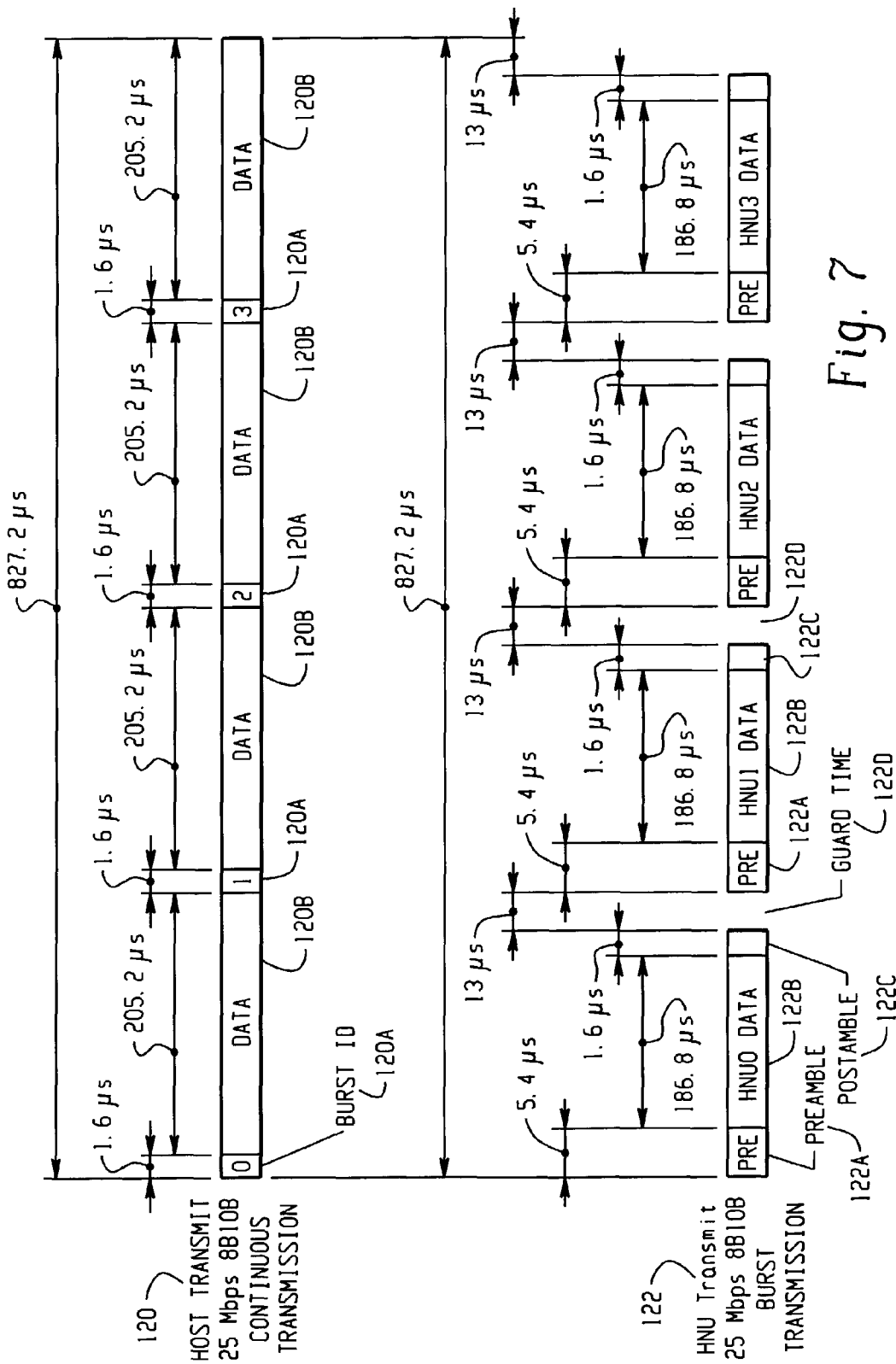

FIG. 7 is a data protocol diagram showing a full-duplex Passive Optical Network (PON) protocol with TDMA return methodology for use with a FTTH system. The top portion 120 of the drawing shows the downstream transmission from the central office equipment 12 to the HNUs 50. This downstream transmission preferably operates at 25 Mbps (with 20 Mbps payload) and is 8B10B encoded to provide packet delineation and also to minimize baseline wander. The downstream protocol includes a 1.6 us long burst ID 120A, which contains information that instructs each HNU (of the 4 in a group) which upstream return slot to use for transmission. The remainder of the downstream protocol is a 205.2 us long data stream 120B. The Burst ID 120A also may include information that indicates which home network units 50 are active so as to minimize the chance for interference in the upstream data path between the HNUs 50 in a group, particularly when a new HNU 50 is connected to the fiber network for the first time.

Each home network unit 50 senses the Burst ID in the data protocol so as to know which upstream time slot (of the four) to communicate in within the upstream TDMA data stream, and also to know which other HNUs 50 in the group are active. Information regarding which HNUs 50 in the group are enabled and transmitting in the TDMA frame is important in the event that a new HNU 50 is connected to the passive optical network. In this situation, the newly attached HNU 50 looks first to see whether other HNUs 50 are active in the group of 4, so that the new HNU 50 won't start transmitting on any of their time slots. The four HNUs 50 in a group share an 827.2 us payload 122 consisting of four burst payloads, one from each of the four HNUs 50. The burst payload includes a preamble 122A that provides clock recovery and symbol synchronization, followed by the HNU data 122B, and then a post amble 122C, which indicates when a particular HNU 50 has finished transmitting in its time slot. Some guard time is provided between the post-amble 122C of one HNU time slot and the preamble 122A of the next time slot. The guard time can be kept relatively short in the present invention (preferably about 13 microseconds) since the 4 HNUs 50 are preferably within 1 km of the 1:4 splitter 46. By keeping the 4 HNUs 50 within a kilometer of each other, their signal delay relative to each other is less than 10 microseconds, and thus only 13 microseconds of guard time is needed between transmissions.

Figure 8:
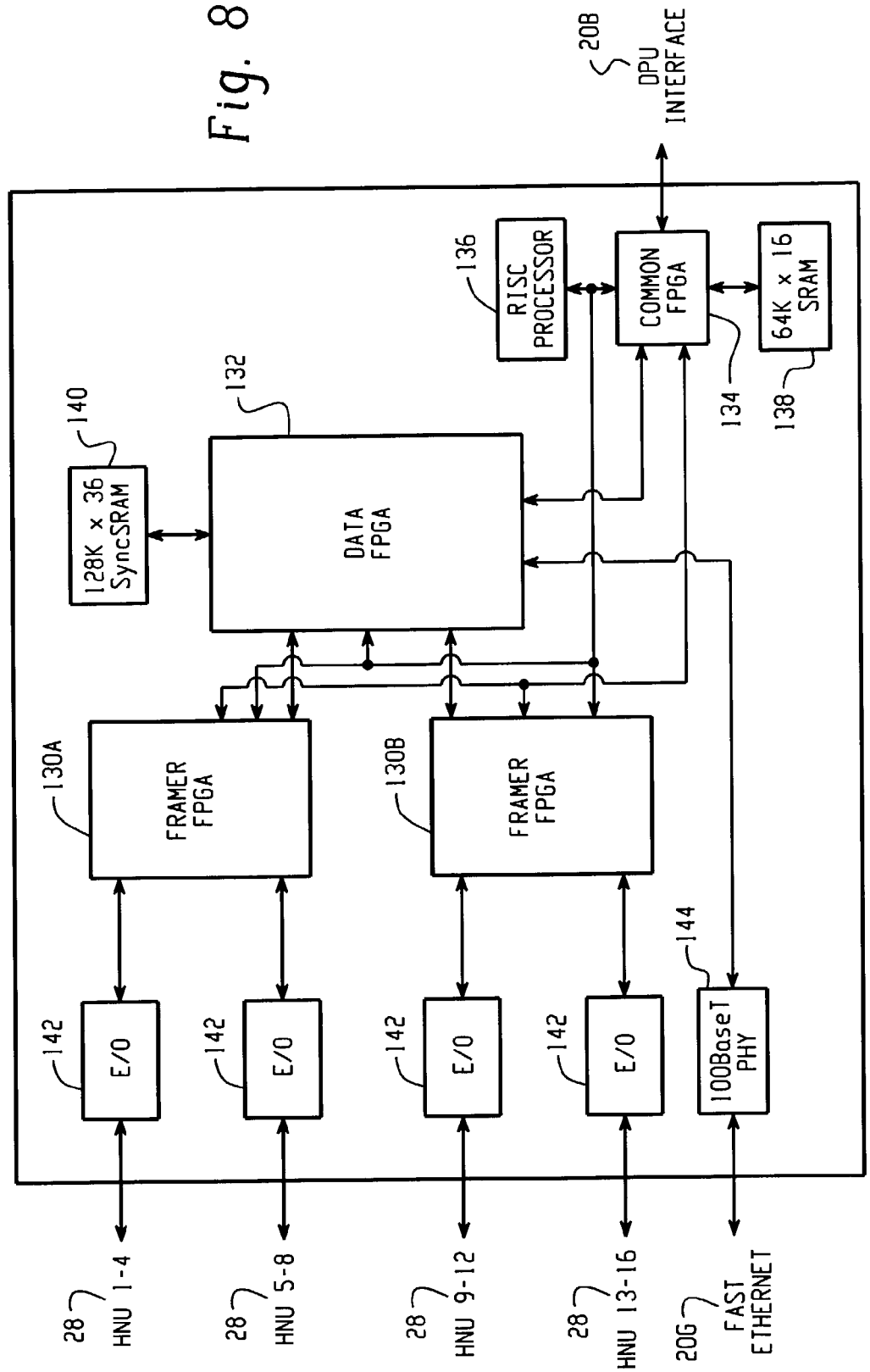

FIG. 8 is an electrical block diagram of a Quad Optical Interface Unit (QOIU) card 20A operating at the CO terminal equipment 12 in a FTTH system. The QOIU card 20A includes four FPGAs, a common FPGA 134, a data FPGA 132, and two framer FPGAs 130A, 130B. Other circuitry on the QOIU card 20A includes a 128K×36 Synchronous RAM (SyncRAM) 140 coupled to the Data FPGA 132, a RISC processor 136, a 64K×16 SRAM coupled to the common FPGA 134, four electrical/optical (E/O) transceivers 142, wherein each E/O block 142 is coupled to one optical fiber, which is in turn coupled to four HNUs 50, and a 100Base-T Ethernet PHY (Physical) integrated circuit 144 for communicating with the Ethernet switch 22 in the Central Office 12.

The common FPGA 134 is coupled to the DPU 20B in the MDS shelf 20F, and handles all the telephony processing, including the voice packetization, etc. Voice communication, alarms, and management and provisioning are handled through the drop processor unit 20B. The data FPGA 132, communicates to a 100 Base-T PHY circuit 144, which is the fast Ethernet interface to the Ethernet switch 22. The data FPGA interfaces to the 100 Base-T PHY 144, and it aggregates packets coming from all 16 HNUs 50 upstream through the four E/O transceiver blocks 142. The Data FPGA 132 includes a separate upstream buffer for each of the 16 HNUs 50 in a high-speed 128 k by 36 synchronous RAM 140. The Data FPGA 132 also includes a separate downstream buffer for each HNU 50. In this manner, the Data FPGA 132 takes data from the 100 Base-T PHY interface 155, buffers it up for each of the fibers and sends it to the fibers as fast as it can, and it takes data from the 16 HNUs 50, puts it all together, and prioritizes it, and sends it out over the 100 Base-T PHY 144 to the Ethernet switch 22.

Each Framer FPGA 130A, 130B includes two framers (as shown in more detail below in FIG. 14.) Each framer is coupled to one of the E/O converters 142, and controls the framing of voice/data packets within a given fiber connection 28.

Also coupled to the FPGAs is a RISC processor 136. The RISC processor 136 stores Ethernet MAC addresses for each QOIU 20A and HNU 50. Since both voice and data are packetized in this system, the QOIU 20A needs to know the various MAC (Media Access Control) addresses of the HNUs 50 so as to enable proper packet delivery down the fiber network. MAC addressing is commonly known in the art of Ethernet packet data transport. The Quad OIU card 20A has an Ethernet MAC address. When a particular HNU 50 is attached to the system, the HNU 50 starts sending packets, which are typically voice packets, upstream towards the Quad OIU 20A with the HNU's source MAC address embedded in these packets. The packets from the particular HNU 50 are routed into the common FPGA 134 and stored in the SRAM 138. Each time the common FPGA 134 detects a new HNU 50, it interrupts the RISC processor 136, and the processor 136 goes out and learns the MAC address of the new HNU 50 so that the QOIU 20A knows how to properly address downstream packets to that HNU 50. The processor 136 then programs the common FPGA 134 so as to respond with a voice stream of packets that are directed towards the proper HNU 50.

Figure 9:
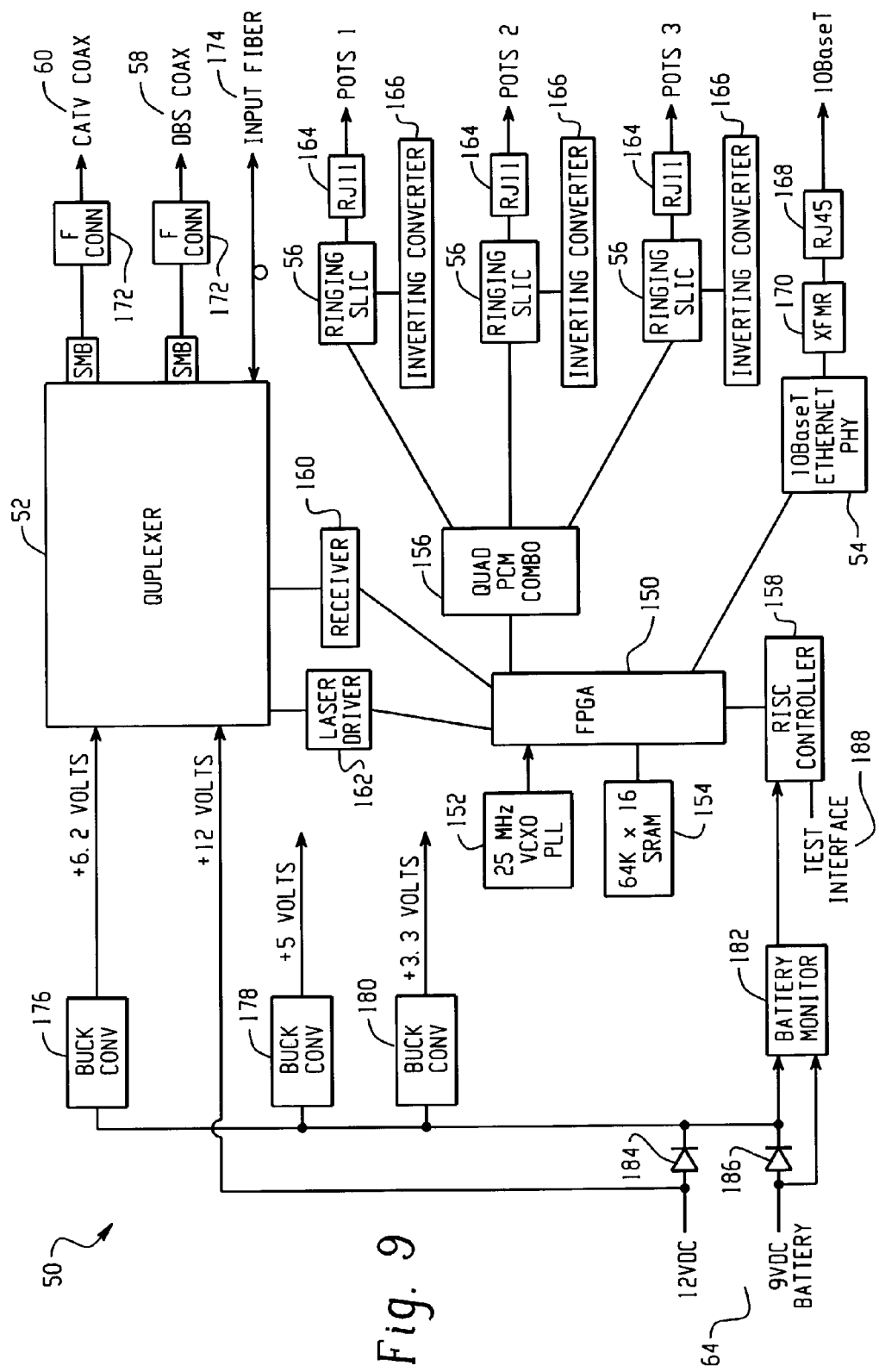

FIG. 9 is an electrical block diagram of the HNU 50. The HNU 50 is a unique part of the FTTH system 10 that provides complete, broadband, multi-media access for a single subscriber, as described generally above. The HNU 50 is a locally-powered advanced network device that provides 3 telephone POTS connections, a bi-directional 10Base-T Ethernet connection, a CATV coaxial connection 60, and a DBS digital TV connection 58. These connections, which are preferably located along a single strip on the bottom of the HNU unit 50, are subsequently connected to the internal phone, data, and TV wiring of the subscriber's home or business, and then coupled to the phones, computers, TVs and other peripherals of the subscriber.

The HNU 50 is a plastic housing that includes a plurality of media connections configured along a bottom edge of the housing. An external power supply is provided that connects to an AC output and converts the 120 VAC power level into a 12 VDC signal to power the electronics in the HNU 50. The external power supply may also include an optional 9VDC battery backup, which provides telephony power in the event of a power failure. The HNU 50 preferably includes a plurality of LEDs that provide an indication of the status of the device, such as whether there has been an error, or whether the unit is operating normally. Inside the HNU 50 is a single circuit card that is snap-fit into the unit, and thus requires no fasteners. This type of construction makes it very simple to upgrade the HNU 50 to other or more powerful multi-media services in the future. The single circuit card holds the circuitry shown in FIG. 9. A fiber splicing tray is mounted in the lid of the HNU housing. An input fiber 48 is routed into the HNU 50, coupled to the fiber splicing tray and fiber 174, and then coupled to the QuPlexer™ module 52 mounted on the circuit card.

Turning now to the functional circuitry of the HNU 50 shown in FIG. 9, the left hand side of the drawing shows the power conditioning and distribution circuitry of the HNU 50. A 12 volts DC line from the external AC-to-DC converter is input to the HNU 50, along with an optional 9 VDC backup power line from the external battery pack. These inputs are diode or-ed together via diodes 184 and 186, and then supplied to the three buck converters 176, 178, 180, and the battery monitor 182. The three buck converters generate various voltages used by the HNU 50, such as 6.2 volts, 5 volts and 3.3 volts. The QuPlexer™ circuit 52 is coupled to the 12 VDC line and the 6.2 volts from the buck converter 176.

The QuPlexer™ 52 is a module that handles all the optics, optical to electrical conversions O/E and E/O, and optical multiplexing/demultiplexing of the various multi-media signals serviced through the HNU 50. An input fiber 174 couples to the QuPlexer™ 52, and carries the 1550 nm video information and the 1310 nm telephony and data information. The QuPlexer™ receives the 1550 nm video signal, isolates it from the 1310 nm signal, converts it to a corresponding electrical signal, and routes that signal to the CATV connector 172 and the DBS connector 172 for distribution to the TV and other peripheral devices in the subscriber's home that are connected to the CATV coax 60 or the DBS coax 58.

The QuPlexer™ 52 is, in turn, coupled to the laser driver 162 and the receiver 160. The laser driver may be similar to that shown above in FIG. 6. The laser driver 162 provides electrical voice/data signals to the QuPlexer™ 52, which are then converted into optical upstream signals at 1310 nm.

The laser driver 162 and the receiver 160 are, in turn, coupled to a control FPGA 150, which includes a 25 MHZ voltage-controlled phase-locked loop (PLL) 152 that locks onto the downstream optical 1310 nm signal to recover the data packets. An SRAM 154 is also coupled to the control FPGA 150 for buffering packets and voice data. A RISC controller 158 is coupled to the control FPGA 150, and stores the MAC address for the HNU 50 and also handles the learning of the Quad OIU card 20A address so that the HNU 50 addresses its voice packets correctly.

A Quad PCM combo CODEC 156 is coupled between the control FPGA 150 and the three POTS circuits, and performs mu-law companding/expanding of the voice signals from the POTS lines. The three POTS circuits include a ringing SLIC (subscriber line interface circuits) 56, an RJ 11 jack 164, and an inverting DC-to-DC converter. The inverting DC/DC converter takes the input 12 VDC or 9 volt battery level and converts it to a negative 24 to 70 volts that is needed for powering the drop telephone line circuit to the home subscriber's telephones. When the circuit is ringing, 75 volts is output from the inverting converter 166, and when the line is off-hook, 24 volts is output from the inverting converter 166 in order to make the circuit more power efficient.

The control FPGA 150 also drives the 10Base-T Ethernet PHY 54, which is an integrated circuit that handles the physical layer transport of Ethernet packets to and from the subscriber's data network. Coupled to the Ethernet PHY 54 is a transformer 170 and then the RJ45 jack 168 for the 10Base-T connection.

The HNU 50 also includes a test interface 188, and a battery monitor circuit 182 for monitoring the status of the external battery pack.

Figure 10:
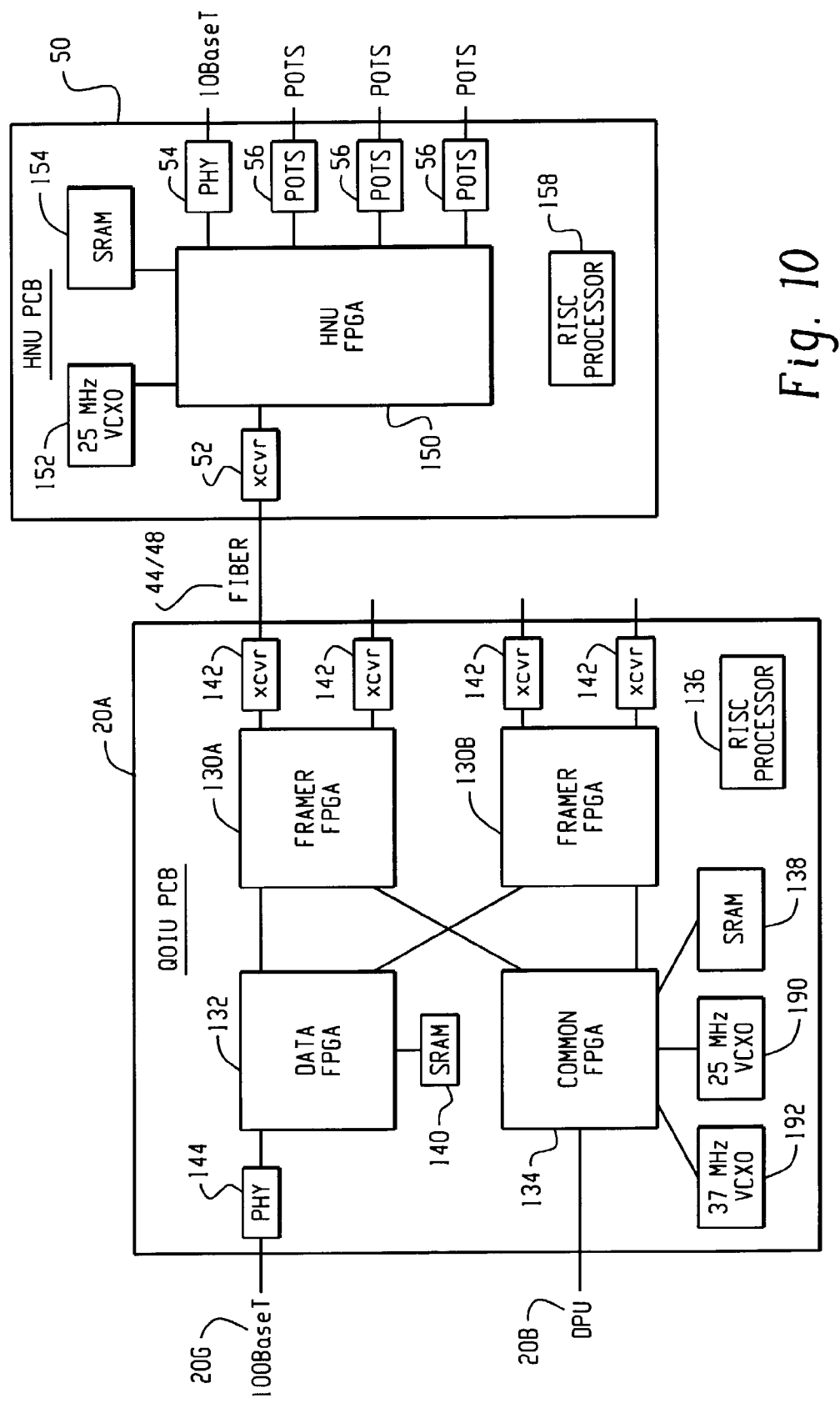

FIG. 10 is a data flow diagram showing the coupling between a QOIU 20A at the central office terminal and one HNU 50 located at the subscriber's premises. As shown in more detail in FIG. 8, the QOIU 20A includes the data FPGA 132 and the common FPGA 134 and the two framer FPGAs 130A, 13B, with two framers included in each one of the framer FPGAs. Thus, there are four framers on each QOIU card 20A. Also shown are the E/O (Electrical/Optical) transceiver blocks 142, the RISC processor 136, the SRAMs 140, 138, and a pair of VCXOs operating at 25 and 37 MHz, respectively. As noted above, the data FPGA 132 is coupled to the 100Base-T line through the Ethernet PHY integrated circuit 144, and the common FPGA is coupled to the DPU 20B.

The framers within the Framer FPGA 130A, 130B (described in more detail below in reference to FIG. 14) aggregate the voice signals coming from the common FPGA 134 and the data signals coming from the data FPGA 132, and merges them together for coupling to the downstream fiber 44/48. Upstream voice/data information is also coupled to the framer, which routes the voice packets to the common FPGA 134 and routes the data packets over to the data FPGA 132 from which they are coupled to the 100Base-T interface 144.

At the HNU 50, the 1310 nm downstream voice/data Packet signals are received by the QuPlexer™ 52, extracted and converted into corresponding electrical signals, and routed to the HNU control FPGA 150. From here, the voice packets are extracted and routed to the three POTS lines 56, and the data packets are extracted and routed to the Ethernet PHY 10Base-T interface 54. Also shown at the HNU 50 are the RISC processor 158, the 25 MHZ VCXO 152, and the support SRAM 154. Upstream voice/data information from the POTS lines and the Ethernet connection are packetized at the FPGA 150 and routed to the QuPlexer™ 52 for conversion to 1310 nm optical signals to launch onto the fiber network 44/48 back to the QOIU card 20A.

Figure 11:
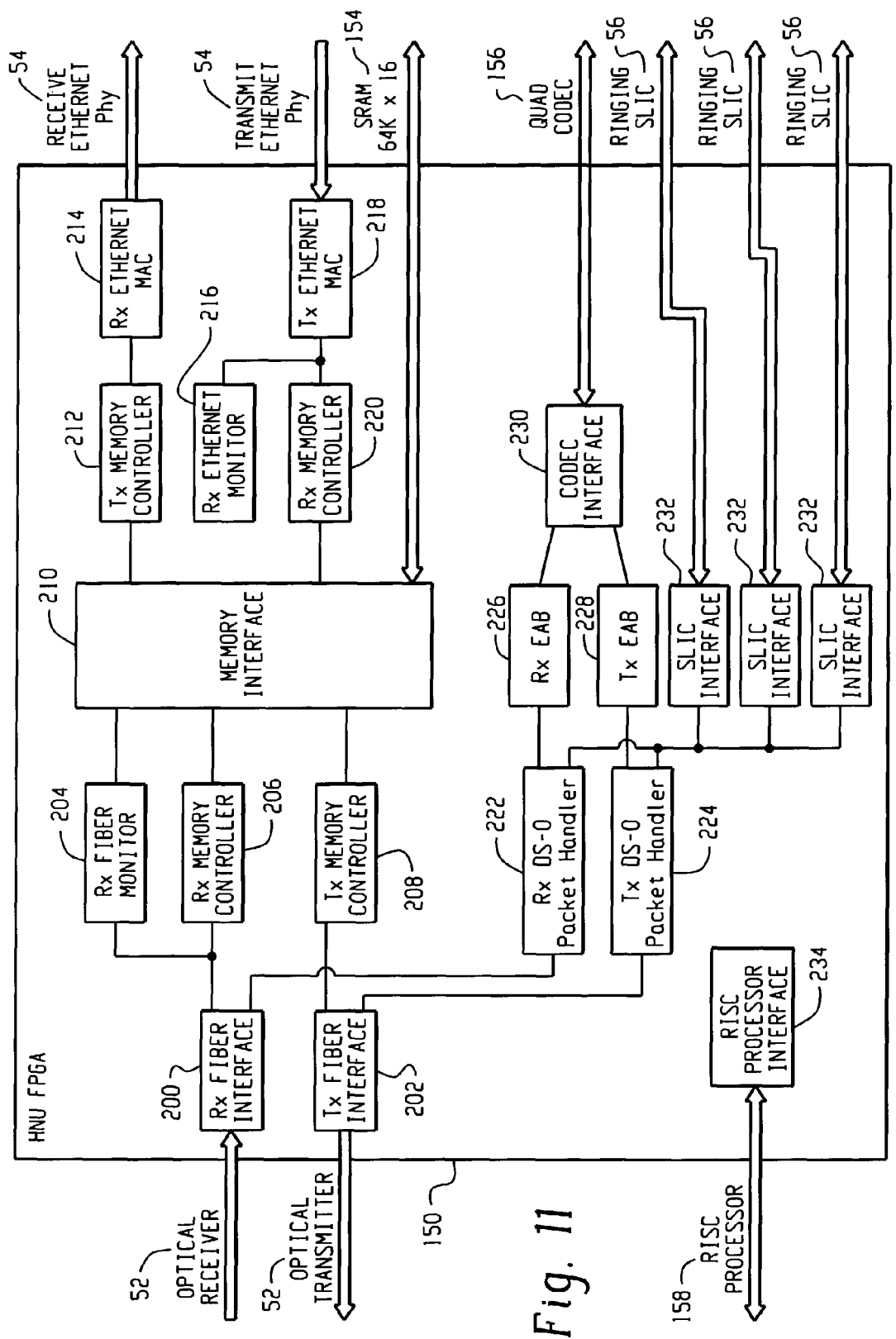

FIG. 11 is an electrical block diagram showing the logical components of the control Field Programmable Gate Array (FPGA) 150 operating within the HNU 50. Beginning at the upper left corner of the figure, the Receiver (Rx) fiber interface block 200 is coupled to the optical receiver and receives packets of information. If those packets match the MAC address of the HNU 50, they are deemed to be voice packets destined for this HNU's telephony interface, and are routed down to the received (Rx) DS-0 packet handler 222, where they are stored into a receive EAB 226. The EAB 226 is an embedded RAM. This received voice information is then fed out smoothly to the CODEC interface 230, and routed off-chip to the Quad CODEC 156. Voice information coming into the CODEC 156 is transferred on-chip through the CODEC interface 230, from which it is routed into a transmit EAB 228 where it is buffered. The transmit (Tx) EAB is also an embedded RAM. Typically, 4 milliseconds of speech is buffered in the Tx EAB 228 before a new voice packet is generated. The transmit DS-0 packet handler 224 transmits a new packet towards the Quad OIU 20A at the central office 12 every 4 milliseconds via the Tx Fiber interface 202, which is coupled off-chip to the laser driver 162 and then the QuPlexer™ 52. Three SLIC interfaces 232 are also coupled to the Rx and Tx DS-0 packet circuitry 222, 224, and control the ringing SLICs 56.

A RISC processor interface 234 is included in the FPGA, and is used to communicate information between the control FPGA 150 and the off-chip RISC processor 158. This is provided so that the processor has access to read and write in the EABs so that it can learn the MAC address of the Quad OIU 20A for packet routing.

As noted above, if the received packet at the Rx Fiber interface 200 matches the HNU's MAC address, it is routed to the receive DS-0 handler 222. If the address of the packet doesn't match the MAC address of the HNU 50, then the packet is routed to the receive memory controller 206, where it gets stored in the 64 k by 16 SRAM 210. Packets are also monitored coming downstream from the home devices to the HNU 50, and if it matches a MAC address that has already been learned by the HNU 50 as being associated with peripherals coupled to the Ethernet PHY 54, then the packet gets forwarded on to the Ethernet connection. If the MAC address doesn't match a learned MAC address at the HNU 50, then it is discarded so that only packets destined to MAC addresses at the particular subscriber's home actually go through the HNU 50. In this manner, packets associated with other HNUs 50 are not visible to the other HNUs 50 on the fiber network.

The receive memory controller 206 writes those packets with learned MAC addresses into the SRAM 154 via the memory interface 210. The transmit memory controller 212 then reads the stored data packets out from the SRAM 154 via the memory interface 210, and sends them to the receive Ethernet MAC 214, and out to the Receiver Ethernet PITY 54 for physical transport to the subscriber's data network.

Data traffic coming from the subscriber's network is received by the transmit Ethernet PHY 54, and is routed on-chip to the Tx Ethernet MAC 218, onto the Rx Memory controller 220, and is written into the SRAM 154 via the memory interface 210. Also shown here is a Rx Ethernet monitor 216, which monitors the incoming data traffic from the subscriber's network and learns the MAC addresses associated with computers (or other devices) in that home. These MAC addresses are stored and utilized by the Rx Memory controller 206 in determining whether received data packets from the QuPlexer™ 52 should be routed onto the subscriber's Ethernet connection or dropped. In one embodiment, the system only carries PPPOE traffic, and therefore the Rx Ethernet Monitor 216 is configured to learn only those MAC addresses associated with PPPOE traffic. In this manner, the subscriber can have a home network in their house with a number of computers, but only those machines that communicate using PPPOE can send/receive data outside the home network.

The transmit memory controller 208 reads data packets out from the memory 154 via the memory interface 21, and routes them out to the transmit fiber interface 202, where the data packets from the Ethernet connection are merged with the voice traffic. The transmit fiber interface 202 prioritizes voice packets from the Tx DS-0 packet generator 224 so as to reduce any latency that may be added to the voice traffic in the event of a large data packet from the Tx memory controller 208. If a large data packet is already in the process of being transmitted, the Tx Fiber Interface will pause transmitting that data packet and cut-through to the voice-packet from the Tx DS-0 packet generator 224 in order to ensure that the voice packets are prioritized, thereby reducing the round-trip latency imposed on voice traffic within the system.

Figure 12:
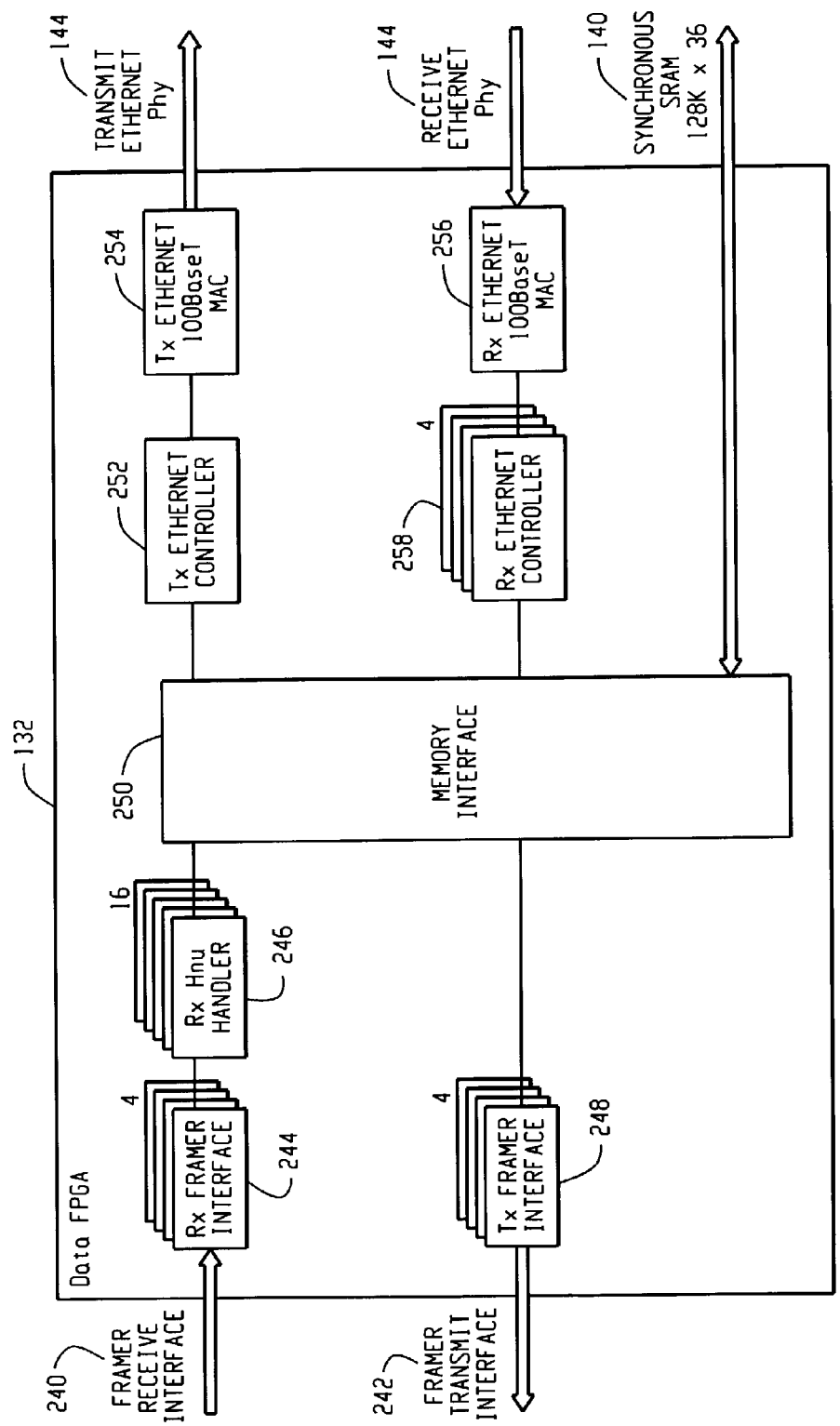

FIG. 12 is an electrical block diagram showing the logical components of a Data FPGA 132 operating within the QOIU card 20A. The Data FPGA 132 includes a plurality of Rx Framer interfaces 244, a plurality of Rx HNU Handlers 246, a Tx Ethernet controller 252, a Tx Ethernet 100Base-T MAC 254, a Rx Ethernet 100Base-T MAC 256 a Rx Ethernet Controller 258, a Tx Framer Interface 248, and a memory interface 250 to the 128K×36 SyncRAM 140.

Referring back to FIG. 10, there are preferably 4 fibers coming in to 4 transceivers 142, that go through the 4 framers 130A, 130B. Each of those 4 framers 130A, 130B examine the data packets to determine whether a particular packet is a voice packet or a data packet. If the packet is a voice packet, then the framer sends it to the common chip 134, and if the packet is a data packet or associated with a MAC address other than the Quad OIU's 20A MAC address, it sends the packet to the data FPGA 132.

Turning back to FIG. 12, then, there are 4 receive framer interfaces 244 for each of the four framers on the QOIU card 20A, one for each fiber. Each fiber supports 4 HNUs 50, and thus there are 4 receive HNU handlers 246 for each fiber, for a total of 16 receive HNU handlers 246. Each of the HNU handlers 246 includes a separate state machine for receiving incoming packets. The HNU Handlers 16 then couple to the memory interface 250, where the packets are written into the synchronous SRAM 140, wherein the data for each HNU 50 is written into a separate memory buffer.

In the upstream direction, each time the receive handler 246 puts a packet in the memory 140 it sends an increment command to the transmit Ethernet controller 252. The transmit Ethernet controller 252 has a counter for each of the HNUs 50, so it knows how many packets are in the RAM 140. The controller 252 includes a scan state machine that scans the HNU buffers in the SyncSRAM 140 to identify traffic that needs to be sent. This traffic is then spooled out of the RAM to the transmit Ethernet 100Base-T MAC, which is, in turn, coupled to the transmit Ethernet PHY 144 for routing to the Ethernet switch 22 at the central office 12.

Data packets coming into the Quad OIU card 20A on the 100Base-T line 20G are received by the receive Ethernet PHY 144, and are then coupled to a receive Ethernet 100Base-T MAC 256. This MAC circuit 256 detects the preamble of the Ethernet packet, performs the CRC checking, etc. If the CRC checking fails, or the packet is too short, then the packet is discarded. The packets from the MAC 256 are then routed to a plurality of Rx Ethernet Controllers 258, preferably one for each fiber coupled to the QOIU card 20A, from which the same packets are written into the buffers for each of the four fibers, these buffers being located in the syncSRAM 140. Alternatively, a function could be implemented on the Data FPGA 132 to learn all the MAC addresses coming upstream, so that the system knows which MAC addresses are associated with which of the four fibers serviced by the QOIU card 20A, and thus a particular packet is only routed to the fiber buffer in memory 140 that is associated with that packet's MAC address. From the memory 140, the packets are then routed out to the four Tx Framer Interface circuits 248 (one for each fiber), and then routed to the Framer FPGAs 130A, 130B.

Figure 13:
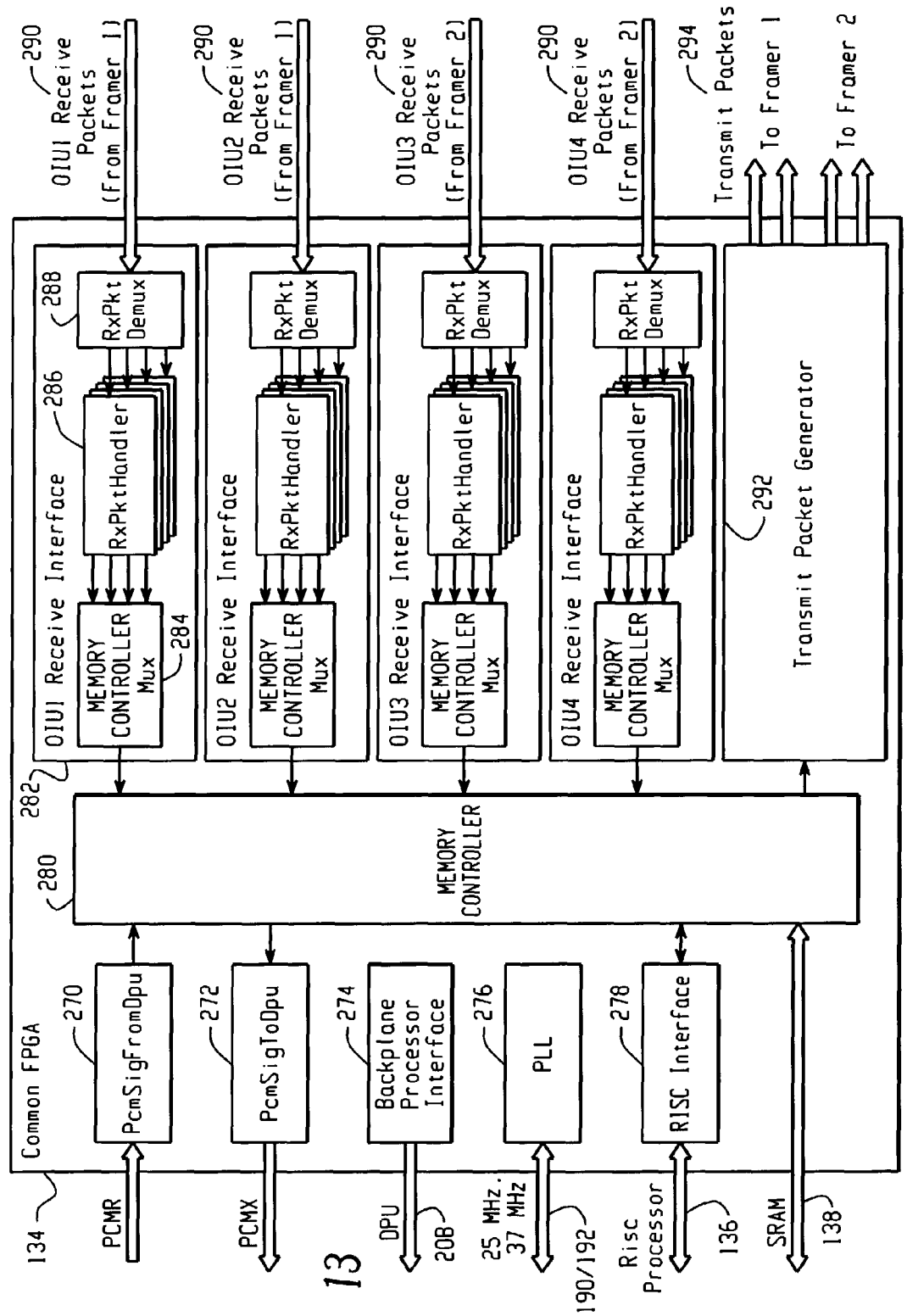

FIG. 13 is an electrical block diagram showing the logical components of a preferred Common FPGA 134 operating within the QOIU card 20A. The Common FPGA 134 includes a PCMR interface block 270 for receiving Pulse-Code Modulated (PCM) data from the DPU controller 20B, a PCMX interface block 272 for transmitting PCM data to the DPU controller 20B, a back-plane processor interface 274, which is also coupled to the DPU 20B, a phase-locked loop block 276, a RISC interface block 278, a memory controller block 280 for interfacing the circuitry on the common FPGA to an associated SRAM 138, a plurality of OIU Receiver interface modules 282 for interfacing with the framers on the Framer FPGA, and a transmit packet generator 292 for transmitting packets to the framers.

The PCM information to and from the DPU 20B gets constructed into memory packets in the SRAM 138 via the memory controller 280, and these memory packets are then routed to the 4 OIU receive interfaces 282, or to the transmit packet generator 292. Each of the receive interfaces 282 includes a memory controller multiplexer 284, a plurality or Rx Packet Handlers 286 (preferably 4, one for each HNU 50 on the fiber), and a Rx Packet Demultiplexer 288. Serial data packets from the framer on one of the receive lines are demultiplexed by the Rx Packet demultiplexer 288 and then routed to the appropriate Rx Packet Handlers 286, depending on which HNU 50 the packets are associated with. The outputs from the handlers 286 are then coupled to the memory controller mux 284, which combines the four outputs from the Rx Packet Handlers 286 into one stream to the memory controller 280, and then to the SRAM 138. On the downstream side, PCM data packets are built up in the memory 138 and routed out to the transmit packet generator 292, which transmits the PCM data packets to the framers on the Framer FPGA.

Figure 14A:
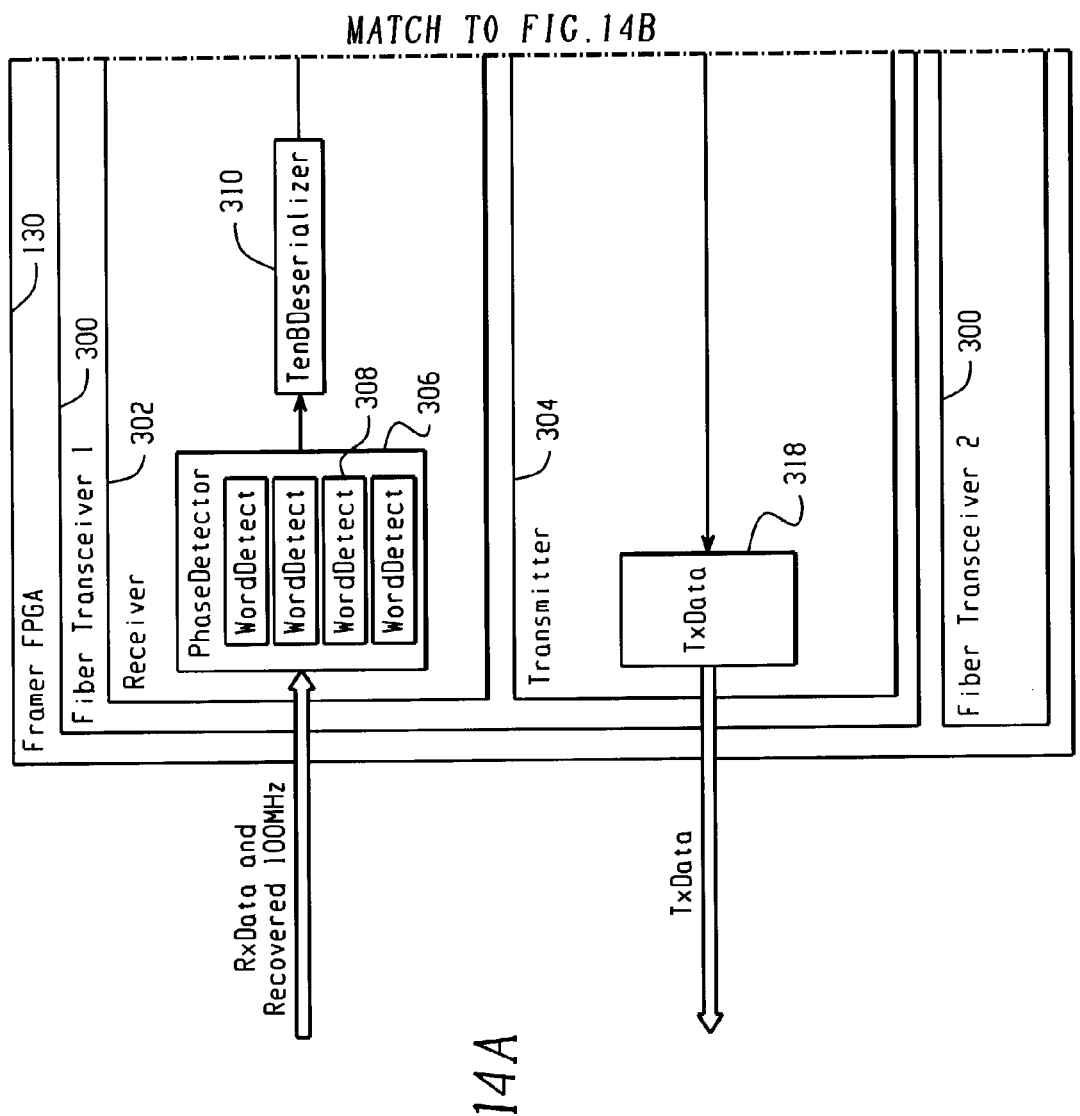
Figure 14B:
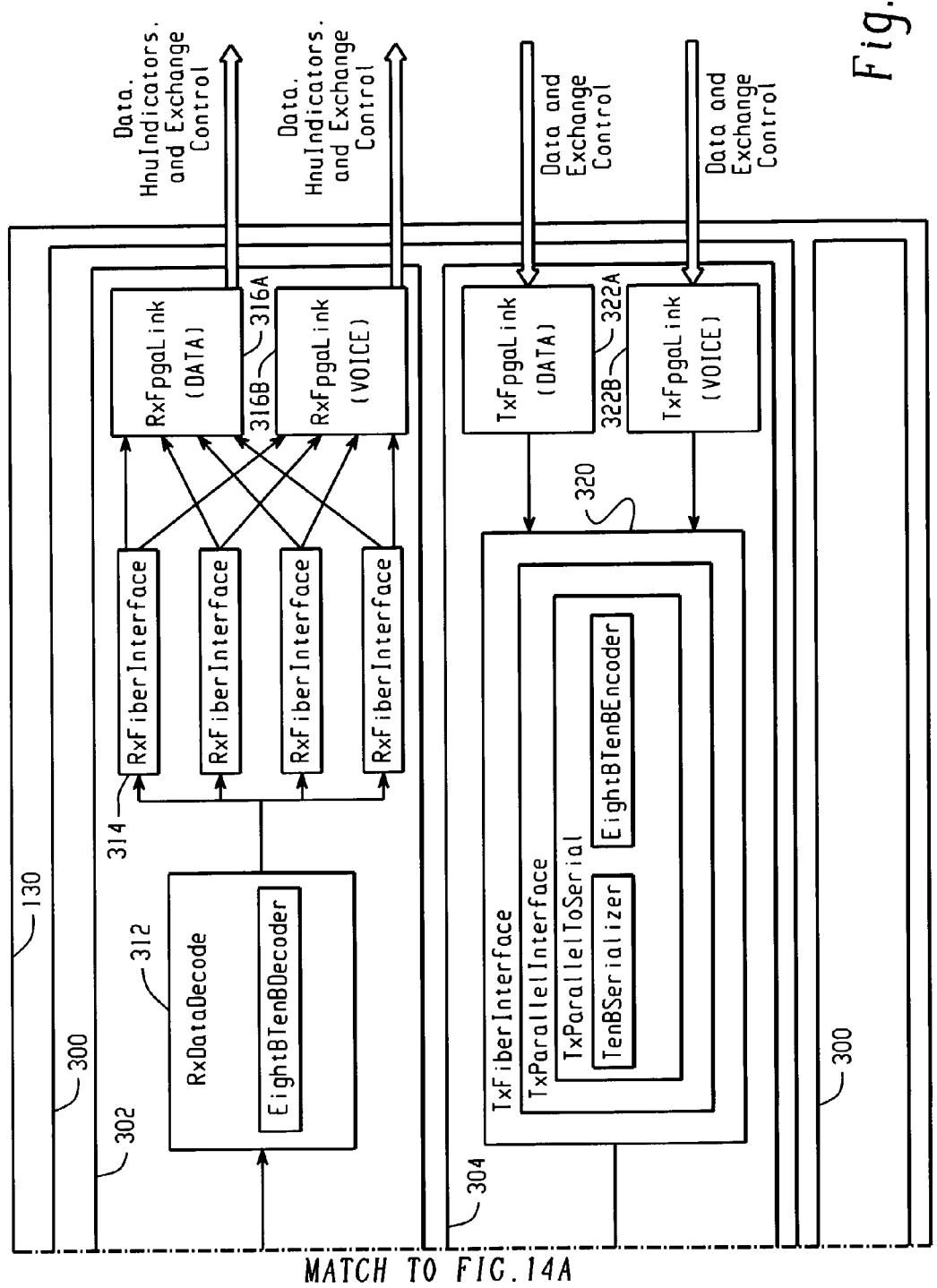

FIG. 14 is an electrical block diagram showing the logical components of a Framer FPGA 130 operating within the QOIU card 20A. There are two framers within each Framer FPGA 130, although FIG. 14 shows the details of just one of those framers. The circuitry shown within the block 300 would be replicated below for the second framer. Thus, each framer FPGA 130 supports two fiber interfaces, and thus 8 HNUs 50.

The framer 300 (or fiber transceiver) includes a receiver 302 and a transmitter 304. The framer receiver 302 includes a phase detector block 306 comprising a plurality of worddetect blocks 308, a TenB Deserializer block 310, an Rx Data Decode block 312 including an 8B10B decoder block, a plurality of Rx Fiber Interface blocks 314, a Rx FPGA link for the data signals 316A, which is coupled to the Data FPGA, and a Rx FPGA link for the voice signals 316B, which is coupled to the Common FPGA. The transmitter 304 includes a Tx FPGA link 322A for receiving data signals from the Data FPGA, a Tx FPGA link 322B for receiving voice signals from the Common FPGA, a Tx Fiber Interface block 320 including a Tx Parallel Interface, a Tx Parallel-to-Serial Interface, a TenB Serializer, and an 8B10B encoder block, and a Tx Data block 318.

On the left hand side of the framer 300 is the fiber interface. Here, the receive data comes into the framer and it is recovered by over-sampling the receive data using four separate receivers 306, 308 running at 100 MHz. These four receivers effectively sample the 25 Mbps NRZ data signal at 90 degree phases. The framer determines which of the four receivers is the best receiver in that it is aligned to recover the data accurately based on detecting a preamble. Once this is determined, the selected receiver locks onto the receive data stream.

A word detector 308 detects the comma character of the 8B10B code. Once this symbol is detected, the receive data stream is routed to a 10B deserializer 310 that recovers the ten-bit word through a receive data decoder 312, which is a 10B to 8B decoder so that out of the 10 bits, the circuit recovers 1 byte of information. In these blocks 310, 312 a control word is detected that indicates the start of a packet, the end of a packet, etc., which are used by the framer to control the pausing of a data packet so that a higher priority voice packet can be cut through, as described above, in order to minimize the voice packet latency through the FTTH system.

From here, the packets are routed to the receiver fiber interface 314, which examines the packets coming in from each home network unit 50. This block 314 monitors the traffic from one HNU 50. When the home network unit 50 stops transmitting, the next fiber interface monitors the traffic from the next HNU 50, and so on for each of the four HNUs 50 serviced by one framer. The receiver fiber interface 314 examines the MAC address of the incoming packets from the particular HNU 50, and depending on the Ethernet ID, the packet is routed to either the data FPGA or the common FPGA. Different Ethernet IDs in the packets indicate whether the packet is a voice packet or a data packet, thus providing level-2 voice packetization over the fiber network. The FPGA links 316A, 316B then transport their respective data and voice packets to either the Data FPGA or the Common FPGA.

On the downstream side, there are links 322A, 322B from the data FPGA and the common FPGA coming into the framer. If the framer receives a voice packet from the common FPGA, the voice packet gets priority over any data packets that may be received from the data FPGA. If there are no voice packets, then the framer selects any incoming data packets through the data link 322A. There is a handshaking function that takes place between the transmitter framer and the data and common FPGAs so as to ensure smooth packet transfer to the transmit fiber interface 320. The interface 320 encodes, serializes and selects the data stream from the data links to form a single transmit stream going out as transmit data and that gets coupled to the fiber transmitter.

Figure 15:
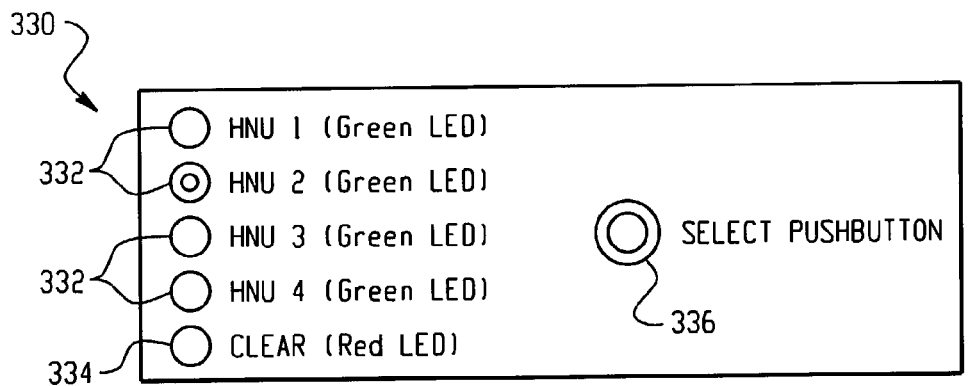

FIG. 15 shows an HNU timeslot selection interface 330 that may be included in the HNUs 50. As noted above, each of the four HNUs 50 in a group transmit upstream to the central office 12 in one of four TDMA data slots. FIG. 15 shows a mechanism for manually selecting the upstream TDMA time slot for a particular HNU 50. An interface 330 is preferably included on the single circuit card in the HNU 50. This interface consists of four green LEDs 332 and a red LED 334. The four green LEDs 332 are marked HNU1, HNU2, HNU3, and HNU4, and the red LED 334 is marked clear. Also included is a select pushbutton 336. The select pushbutton is used to select the upstream TDMA timeslot for the HNU 50. Each time the pushbutton 336 is depressed, the HNU 50 will cycle from one HNU timeslot to the next, and the associated green LED will be illuminated indicating which HNU timeslot is currently selected.

Figure 16A:
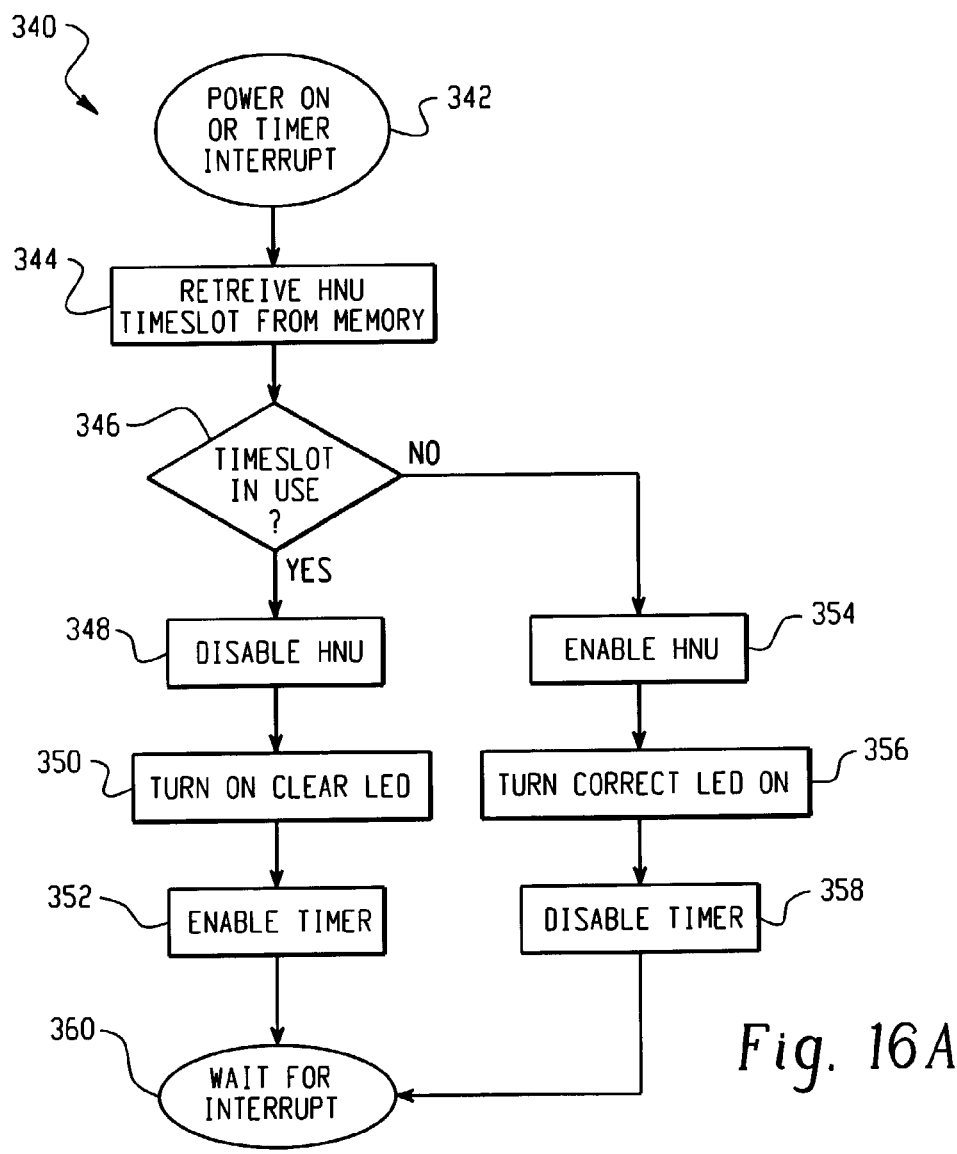

FIG. 16A sets forth the methodology 340 of automatically selecting an HNU timeslot when power is first applied to the HNU 50. Beginning at step 342, power is applied to the HNU 50, or, as described below, a timer interrupt causes the already-powered up HNU 50 to proceed to the remaining steps of the method. At step 344, the HNU 50 retrieves a pre-programmed HNU timeslot from memory. The HNU 50 then determines, at step 346, if that timeslot is already in use by another HNU 50 in the group of four HNUs 50. If the timeslot is not in use, then at step 354 the HNU 50 is enabled to communicate on the stored timeslot. At step 356, the LED corresponding to that timeslot is then illuminated, and at step 358, the timer interrupt is disabled. Control then passes to step 360, where the HNU 50 is waiting for an interrupt to occur (such as the pushbutton interrupt described with reference to FIG. 16B.)

If, however, at step 346, the HNU 50 determined that the timeslot was in use by another HNU 50, then control passes to steps 348, 350, and 352, where the HNU is disabled from communicating on that timeslot, the clear LED is illuminated indicating that the HNU 50 is not communicating, and a timer interrupt is enabled. Control then passes to step 360, where the HNU is waiting for an interrupt to occur. Having enabled the timer interrupt at step 352, this interrupt at step 360 could be the timer interrupt or it could be the pushbutton interrupt described below. When the timer expires, an interrupt is generated that causes the HNU 50 to loop back to step 342, and repeat steps 344 to 360.

Figure 16B:
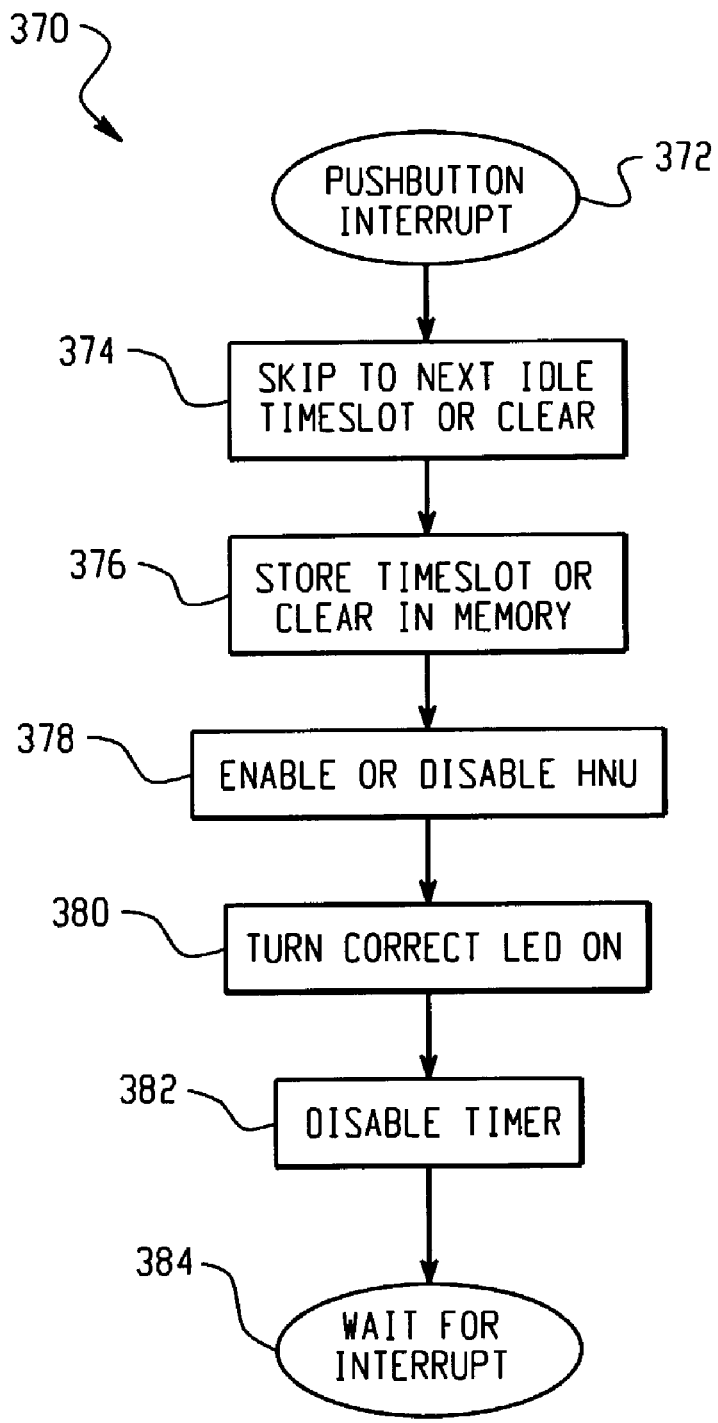

FIG. 16B sets forth the methodology 370 of manually selecting an HNU timeslot. If the HNU 50 is trying to communicate on a timeslot that is already associated with another HNU 50, then the method shown in FIG. 16A will result in the HNU 50 turning on its clear LED to indicate that it is not communicating. Using some type of pushbutton 336, switch, or other type of signal generator, a user or installation specialist can cause the HNU 50 to select one of the other four timeslots. When the pushbutton 336 is depressed, an interrupt is generated at step 372. This pushbutton interrupt causes the HNU 50 to cycle to the next clear timeslot at step 374. This next timeslot is then stored in the HNU memory as its new default timeslot. At step 378 the HNU 50 is enabled to communicate on the new timeslot, at step 380 the correct LED indicator for that timeslot is illuminated, and at step 382, the timer interrupt is disabled. Control then passes to step 384, where the HNU 50 is waiting for another pushbutton interrupt to occur.

III. Media Access Control (MAC) Layer Address Translation

Figure 17:
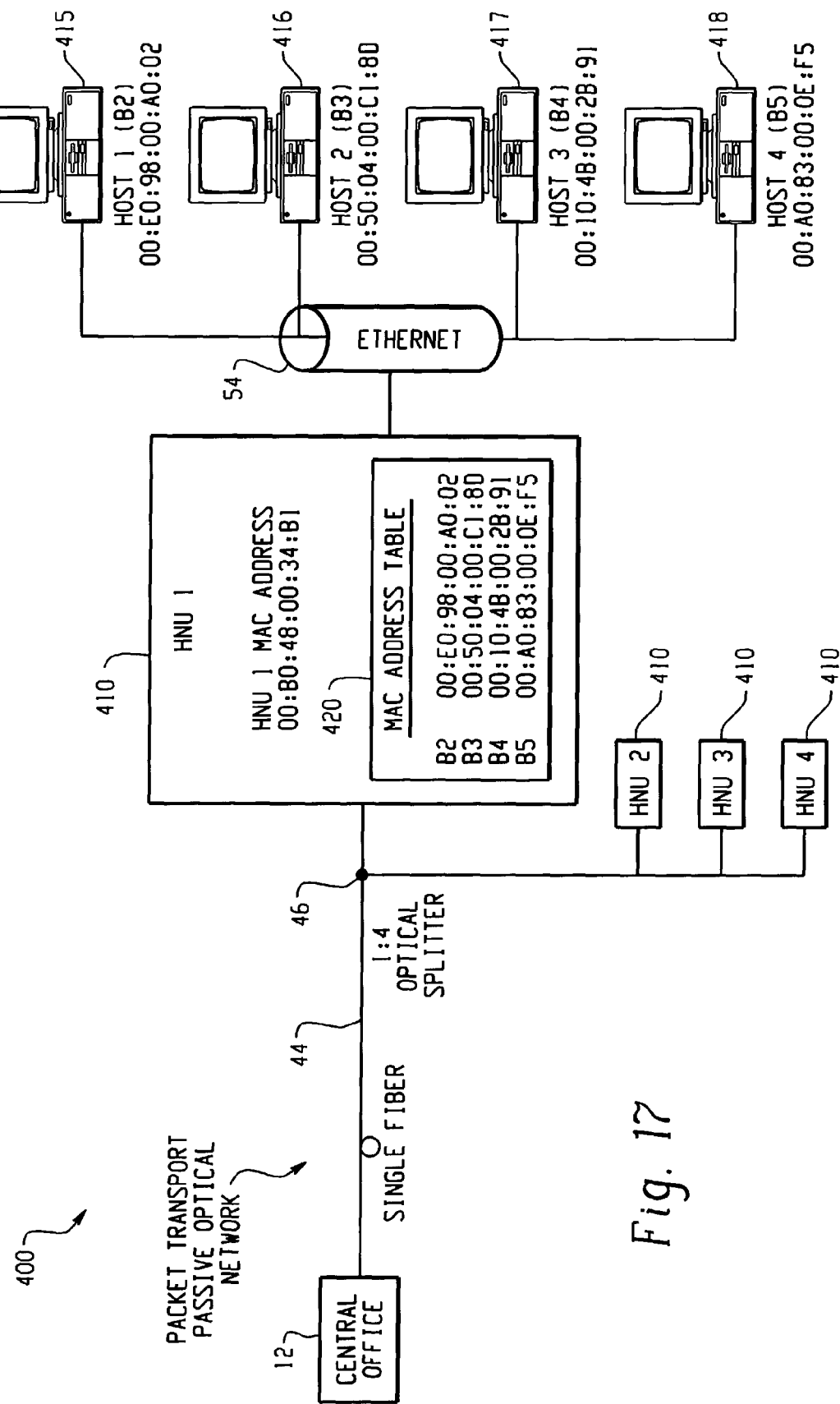
FIG. 17 illustrates an exemplary FTTH system with an Ethernet connection supporting MAC layer address translation.

FIG. 17 illustrates an exemplary FTTH system 400 with an Ethernet connection supporting MAC layer address translation. The system 400 includes a plurality of HNUs 410 coupled to the central office 12 via the passive optical network (PON) 44, 46. Preferably, each single fiber 44 in the PON is split with a passive splitter 46 to support four HNUs 410. In addition, each HNU 410 in the system 400 is coupled to a plurality of host systems 415-418 via an Ethernet drop 54.

The central office 12 and PON 44, 46 may be similar to those described above. For example, the central office 12 preferably includes a QOIU 20A, Ethernet switch 22, and PPPOE server 26A, as describe above with reference to FIG. 4.

The host systems 415-418 are processing devices, such as personal computers, that are configured to communicate over an Ethernet connection. Each host system 415-418 is assigned a static MAC address, typically by a manufacturer, that identifies the device on the Ethernet. Exemplary MAC addresses are shown in FIG. 17 for each of the four illustrated host systems 415-418. For example, one illustrated host system (host 1) 415 is shown with a corresponding MAC address of 00:E0:98:00:A0:02. It should be understood, however, that the MAC addresses shown in FIG. 17 are provided for illustrative purposes only.

The HNUs 410 are each assigned a base MAC address (e.g., 00:B0:48:00:34:B1) that is used to transmit and receive data traffic over the PON 44, 46, as described above. In addition, the HNUs 410 are also assigned a plurality of secondary MAC addresses, each corresponding to one of the host systems 415-418 coupled to the HNU 410 via the Ethernet drop 54. Preferably, the secondary MAC addresses of the HNU 410 are assigned by incrementing the base MAC address by a set value. In the illustrated embodiment, for example, the secondary MAC address corresponding to host 1 (415) is 00:B0:48:00:34:B2, which is assigned by incremented the base MAC address by a value of 1. Operationally, data traffic may be transmitted to and from the HNU 410 using either the base MAC address or any of the secondary MAC addresses.

In addition, the HNUs 410 each include a MAC address look-up table 420 that is used to relate the secondary HNU MAC addresses with corresponding host MAC layer addresses. For example, in the illustrated embodiment, the MAC address look-up table 420 relates the secondary HNU MAC address 00:B0:48:00:34:B2 with the host MAC address 00:E0:98:00:A0:02. For convenience, the secondary HNU MAC addresses shown in the illustrated exemplary MAC address look-up table 420 are identified by only their two least significant digits (e.g., B2-B5). Preferably, the MAC address look-up table 420 relates each host MAC address (e.g., 00:E0:98:00:A0:02) with an entire 6 byte secondary HNU MAC address (e.g., 00:B0:48:00:34:B2). In other embodiments, however, the MAC address look-up table 420 may use alternative schemes to identify the secondary HNU MAC addresses, such as relating only the least significant bit or byte of a secondary HNU MAC address with a corresponding host MAC address.

The MAC address look-up table 420 may, for example, be stored in a memory device accessible by a processor in the HNU 410. The HNUs 410 may also include a MAC address translation software module that is executed by a processor in the HNU 410 to query the MAC address look-up table 420. In addition to MAC layer address translation, the HNUs 410 may also provide additional functionality, similar to the HNU 50 described above with reference to FIG. 1.

In operation, the HNUs 410 help to prevent MAC spoofing in the FTTH system 400 by denying external access to the MAC layer addresses of the host systems 415-418. When a data packet is transmitted from a host system 415-418, the MAC layer address of the host system 415-418 is translated into a secondary MAC layer address for the HNU 410 before the data packet is transmitted through the FTTH system 400 to the network 26. Similarly, data packets sent to a host system 415-418 are addressed with a secondary HNU MAC layer address 410. In this manner, access to the MAC layer addresses of the host systems 415-418 is limited to the HNU 410.

For example, if one of the host systems (e.g., host 2) 416 addresses a data packet for transmission to a packet data network 26, such as the Internet, then the data packet is first transmitted over the Ethernet 54 to the HNU 410. The data packet from the host system 416 initially includes a header that identifies the MAC address (e.g., 00:50:04:00:C1:8D) assigned to the host system 416. Once the data packet is received by the HNU 410, the MAC address table 420 is queried to translate the host MAC address (e.g., 00:50:04:00:C1:8D) into a corresponding secondary HNU MAC address (e.g., 00:B0:48:00:34:B3). The data packet header is then modified by the HNU 410 to replace the MAC address of the host system 416 with the identified secondary MAC address for the HNU 410. In addition, if the outgoing data packet is an ARP request, then the HNU 410 may also modify the Ethernet address embedded in the payload data to the identified secondary HNU MAC address. The modified data packet is then transmitted over the FTTH system 400 to the network 26.

Figure 18:
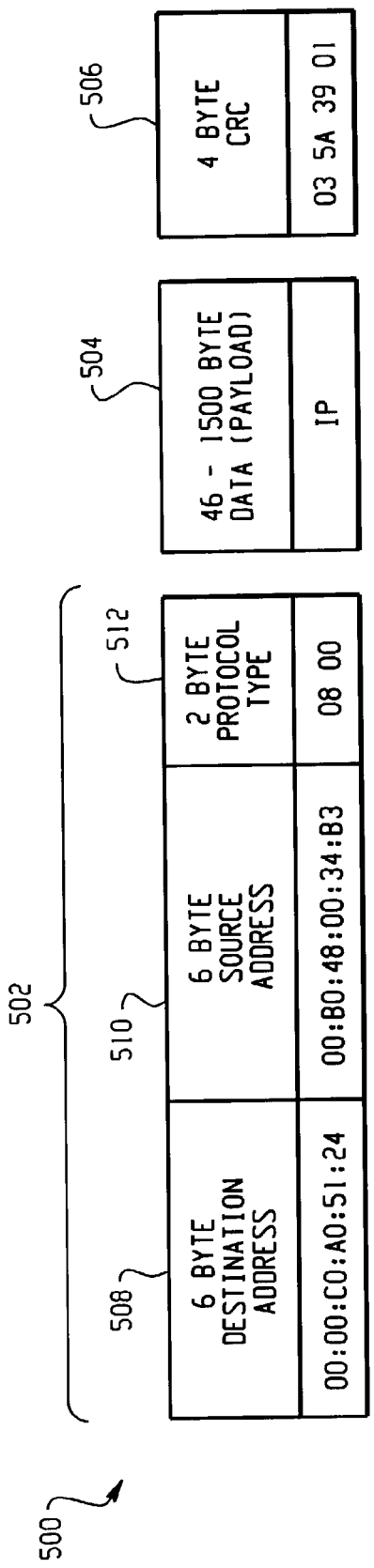
FIG. 18 shows an example of an outgoing data packet transmitted from the home network unit (HNU) of FIG. 17 to a network device.

An example of an outgoing data packet 500 transmitted from the HNU 410 to a network device is shown in FIG. 18. The data packet includes a header 502, a data payload 504, and a CRC checksum 506. The header 502 includes a 6 byte destination address 508 that identifies the network device, a 6 byte source address 510 that identifies the HNU 410, and a 2 byte protocol field 512 that identifies the protocol of the data payload (e.g., IP). As explained above, the source address 510 of the data packet 500 is a secondary MAC layer address that identifies the HNU 410 and also identifies one of the host systems 415 by means of its least significant byte (e.g., B2).

The secondary HNU MAC layer address may be assigned to a particular host system 415-418 in the MAC address table 420 either statically or dynamically to identify the host device 415-418 from which the data packet was initiated. For example, in one embodiment, the secondary HNU MAC addresses may be dynamic. That is, a secondary HNU MAC address may be temporarily assigned to a particular host system 416 when the host system 416 first communicates with the HNU 410. The secondary HNU MAC address may then be reassigned to another host device 415, 417, 418 if the HNU 410 and host system 416 are not in communication for a set period of time. In another embodiment, the secondary HNU MAC addresses may be static. That is, each host system 415-418 may be permanently assigned a secondary HNU MAC address in the MAC address table 420.

Because data packets are never transmitted to the network 26 with the secure MAC layer address of the host device 415-418, all transmissions from the network 26 will be addressed with one of the MAC addresses (i.e., base or secondary) of a HNU 410. For example, a network device sending a data packet to one of the host systems (e.g., host 2) 416 in the FTTH system 400 will address the data packet with a secondary HNU MAC layer address (e.g., 00:B0:48:00:34:B3). Once the data packet is detected and received by the HNU 410, the MAC address table 420 is queried to translate the secondary HNU MAC address (e.g., 00:B0:48:00:34:B3) into the secure MAC layer address (e.g., 00:50:04:00:C1:8D) for the host system 416, and the header is modified to transmit the data packet to the identified host system 416 via the Ethernet drop 54.

Figure 19:
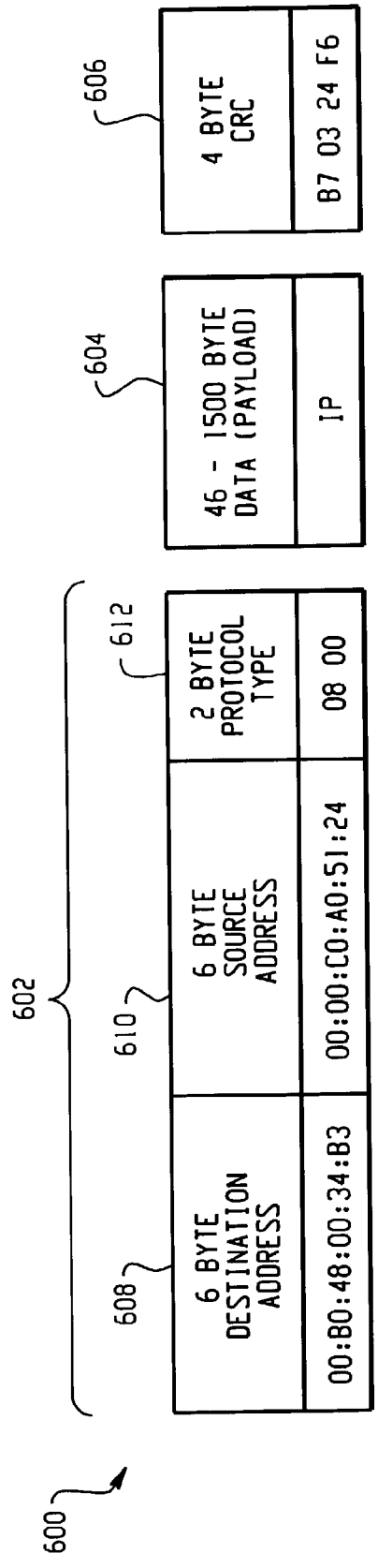
FIG. 19 shows an example of an incoming data packet transmitted from a network device to the HNU of FIG. 17.

An example of an incoming data packet 600 transmitted from a network device to the HNU 410 is shown in FIG. 19. Similar to the outgoing data packet 500 shown in FIG. 17, the incoming data packet 600 includes a header 602, a data payload 504, and a CRC checksum 506. The header 602 includes a source address 610 that identifies the network device, a destination address 608 that identifies the HNU 410, and a protocol field 612 that identifies the protocol of the data payload 504 (e.g., IP). As explained above, the destination address 608 in the data packet header 602 is a secondary HNU MAC address that identifies both the HNU and a particular host system 416.

This written description uses examples to disclose the invention, including the best mode, and also to enable a person skilled in the art to make and use the invention. The patentable scope of the invention is defined by the claims, and may include other examples that occur to those skilled in the art.

It is claimed:

1. In a fiber to the home (FTTH) system including a central office that interfaces a packet data network with a passive optical network (PON), a media access control (MAC) layer address translation system, comprising:
 a home network unit (HNU) coupled to the PON and having an associated base MAC layer address and an associated secondary MAC layer address that identify the HNU within the PON;
 a host system coupled in a network to the HNU and having an associated host MAC layer address that identifies the host system within the network; and
 a MAC address table stored in a memory device that associates the host MAC layer address with the secondary MAC layer address;
 wherein upon receiving an outgoing transmission from the host system that includes the host MAC layer address, the HNU accesses the MAC address table to determine the secondary MAC layer address that is associated with the host MAC layer address and modifies the outgoing transmission to replace the host MAC layer address with the secondary MAC layer address.

2. The system of claim 1, wherein upon receiving an incoming transmission from the packet data network that includes the secondary MAC layer address, the HNU accesses the MAC address table to determine the host MAC layer address that is associated with the secondary MAC layer address and modifies the incoming transmission to replace the secondary MAC layer address with the host MAC layer address.

3. The system of claim 1, wherein the network includes a plurality of host systems coupled to the HNU via an Ethernet drop.

4. The system of claim 1, wherein the packet data network is an Internet.

5. The system of claim 1, wherein the PON includes a plurality of single optic fibers, each optic fiber being split with a passive optic splitter to feed a plurality of home network units (HNUs).

6. The system of claim 5, wherein each single optic fiber in the PON feeds four HNUs.

7. The system of claim 1, wherein the host system is a personal computer.

8. The system of claim 1, wherein the MAC address table is stored in a memory device within the HNU.

9. The system of claim 1, further comprising a MAC address translation software module executing on a processor in the HNU that queries the MAC address table to determine the host MAC layer address and modify the outgoing transmission.

10. The system of claim 1, wherein the secondary MAC layer address is assigned by incrementing the base MAC layer address by a pre-determined number.

11. The system of claim 1, wherein the HNU determines if the outgoing transmission from the host system is an address resolution protocol (ARP) request, and if the outgoing transmission is an ARP request, then the HNU modifies a data payload portion of the outgoing transmission to replace the host MAC layer address included within the data payload with the secondary MAC layer address.

12. The system of claim 1, wherein the HNU associates the secondary MAC layer address with the host MAC layer address in the MAC address table.

13. The system of claim 12, wherein the secondary MAC layer address is statically associated with the host MAC layer address in the MAC address table.

14. The system of claim 12, wherein the secondary MAC layer address is dynamically associated with the host MAC layer address in the MAC address table and is re-associated with a MAC layer address for another host system if the host system is out of communication with the HNU for a set period of time.

15. In a fiber to the home (FTTH) system including a central office that interfaces a packet data network with a passive optical network (PON), a media access control (MAC) layer address translation system, comprising:
 a home network unit (HNU) coupled to the PON and having an associated base MAC layer address and an associated secondary MAC layer address that identify the HNU within the PON;
 a host system coupled in a network to the HNU and having an associated host MAC layer address that identifies the host system within the network; and
 means for associating the host MAC layer address with the secondary MAC layer address; and
 means for modifying an outgoing transmission from the host system to replace the host MAC layer address with the secondary MAC layer address.

16. The system of claim 15, further comprising:
 means for detecting the secondary MAC layer address in an incoming transmission;
 means for determining the host MAC layer address associated with the detected secondary MAC layer address; and
 means for modifying the incoming transmission to replace the secondary MAC layer address with the host MAC layer address.

17. The system of claim 15, wherein the network includes a plurality of host systems coupled to the HNU via an Ethernet drop.

18. The system of claim 15, wherein the packet data network is an Internet.

19. The system of claim 15, wherein the PON includes a plurality of single optic fibers, each optic fiber being split with a passive optic splitter to feed a plurality of home network units (HNUs).

20. The system of claim 15, wherein each single optic fiber in the PON feeds four HNUs.

21. The system of claim 15, wherein the host system is a personal computer.

22. The system of claim 15, wherein the secondary MAC layer address is assigned by incrementing the base MAC layer address by a pre-determined number.

23. The system of claim 15, further comprising:
 means for determining if the outgoing transmission from the host system is an address resolution protocol (ARP) request, and if the outgoing transmission is an ARP request, then the modifying a data payload portion of the outgoing transmission to replace the host MAC layer address within the data payload with the secondary MAC layer address.

24. In a fiber to the home (FTTH) system including a central office that interfaces a packet data network with a passive optical network (PON), a method for providing a secure connection between a host device in the FTTH system and the packet data network, comprising:
  providing a home network unit (HNU) coupled in the FTTH between the PON and the host device and having an associated base MAC layer address and an associated secondary MAC layer address that identify the HNU within the PON;
  transmitting an outgoing data packet from the host device to the HNU that includes a host MAC layer address associated with the host device;
  accessing a MAC address table to associate the host MAC layer address with the secondary MAC layer address;
  modifying the outgoing data packet to remove the host MAC layer address and add the secondary MAC layer address; and
  transmitting the modified outgoing data packet from the HNU to the packet data network via the PON and central office.

25. The system of claim 24, comprising the further steps of:
  determining if the outgoing data packet from the host device is an address resolution protocol (ARP) request; and
  if the outgoing data packet is an ARP request, then modifying a data payload portion of the outgoing data packet to replace the host MAC layer address included within the data payload with the secondary MAC layer.

26. The system of claim 24, comprising the further step of assigning the secondary MAC layer address in the MAC address resolution table to the host MAC layer address.

27. The system of claim 26, wherein the secondary MAC layer address is statically assigned to the host MAC layer address.

28. The system of claim 26, wherein the secondary MAC layer address is dynamically assigned to the host MAC layer address, and comprising the further step of re-assigning the secondary MAC layer address to a MAC layer address for another host device if the host device is out of communication with the HNU for a set period of time.

\* \* \* \* \*